(12) United States Patent
Jeong

(10) Patent No.: US 10,245,698 B2
(45) Date of Patent: Apr. 2, 2019

(54) METHOD AND APPARATUS FOR EFFICIENT USE OF CNC MACHINE SHAPING TOOL INCLUDING CESSATION OF USE NO LATER THAN THE ONSET OF TOOL DETERIORATION BY MONITORING AUDIBLE SOUND DURING SHAPING

(71) Applicant: MASSACHUSETTS INSTITUTE OF TECHNOLOGY, Cambridge, MA (US)

(72) Inventor: Hyunsoo Jeong, Boston, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 124 days.

(21) Appl. No.: 15/586,695

(22) Filed: May 4, 2017

(65) Prior Publication Data
US 2017/0320182 A1    Nov. 9, 2017

Related U.S. Application Data

(60) Provisional application No. 62/332,574, filed on May 6, 2016.

(51) Int. Cl.
*B23Q 17/09* (2006.01)
*G05B 19/4065* (2006.01)

(52) U.S. Cl.
CPC ....... *B23Q 17/098* (2013.01); *G05B 19/4065* (2013.01); *G05B 2219/33002* (2013.01); *G05B 2219/37337* (2013.01)

(58) Field of Classification Search
CPC combination set(s) only.
See application file for complete search history.

(56) References Cited

U.S. PATENT DOCUMENTS

| | | |
|---|---|---|
| 4,636,779 A | 1/1987 | Thomas et al. |
| 4,658,245 A | 4/1987 | Dye et al. |

(Continued)

FOREIGN PATENT DOCUMENTS

WO    WO 99/15310    4/1999

OTHER PUBLICATIONS

Xiaoli Li, International Journal of Machine Tools & Manufacture vol. 42, pp. 157-165, (Year: 2002).*

(Continued)

*Primary Examiner* — Kenneth M Lo
*Assistant Examiner* — Chad G Erdman
(74) *Attorney, Agent, or Firm* — Daly, Crowley, Mofford & Durkee, LLP

(57) ABSTRACT

A CNC machine shaping tool is efficiently used by monitoring human audible sound during shaping. A sound information set is created for a tool shaping a workpiece. Shaping sounds are recorded and sliced into short term units. A human operator assigns tool condition labels to each slice. Short term units are combined into mid term units. Noise is reduced by profiling. Mid term sound related features of time and frequency domains are extracted. Dimensionality is reduced by robust principal component analysis. The principal component set is balanced, e.g. by SMOTE. A classifier and principal components are selected. An information set of patterns of values of selected principal components for the tool is created. In an industrial setting, shaping sounds are recorded, noise reduced and select principal component vector values are compared to the tool condition labeled patterns of values in the information set to identify tool condition before deterioration.

24 Claims, 8 Drawing Sheets

(56) References Cited

U.S. PATENT DOCUMENTS

| | | |
|---|---|---|
| 5,170,358 A | 12/1992 | Delio |
| 2005/0265124 A1 | 12/2005 | Smith |
| 2015/0313535 A1* | 11/2015 | Alshaer ................ A61B 5/4812 |
| | | 600/529 |
| 2016/0283185 A1* | 9/2016 | McLaren ................ G06F 3/165 |

OTHER PUBLICATIONS

PCT Search Report of the ISA for PCT Application No. PCT/US2017/031011; 5 pages.
PCT Written Opinion of the ISA for PCT Application No. PCT/US2017/031011; 10 pages.

* cited by examiner

METHOD AND APPARATUS FOR EFFICIENT USE OF CNC MACHINE SHAPING TOOL INCLUDING CESSATION OF USE NO LATER THAN THE ONSET OF TOOL DETERIORATION BY MONITORING AUDIBLE SOUND DURING SHAPING

RELATED DOCUMENT

Priority is claimed to U.S. Provisional Patent Application No. 62/332,574, filed on May 6, 2016, entitled METHOD AND SYSTEM FOR PREDICTING INCIPIENT CUTTING TOOL FAILURE, Inventor, Hyunsoo Jeong, APPLICANT, Assignee, Massachusetts Institute of Technology, of Cambridge, Mass., the complete disclosure of which is hereby incorporated by reference.

BACKGROUND

Inventions described herein relate generally to the field of machine tool operation, and more specifically to methods and systems for anticipating incipient shaping tool deterioration and failure early enough to stop operation of the machine tool, before any tool failure occurs, and thus to avoid damage to the cutting tool, the machine in use, the part being made, its local environment and harm to the operator. Computerized Numerically Controlled machining (so called CNC machining) accounts for a very significant amount of the machining done in modern factories and workshops. CNC machines operate largely under computer control. An operator sets up the machine, including placing a work piece on the machine work table, and providing an appropriate shaping tool in the tool holder. The operator then activates the machine to follow instructions as to shaping location, direction, speed of motion from one location to another, etc., under control of instructions from a computer or processor that has been programmed to fabricate the specific part using the specific machine. The programming is referred to as numerical control (NC).

There are many types of shaping operations and shaping tools. Shaping operations and tools include, but are not limited to: milling, drilling, lathe-turning, sanding, grinding, sawing, and other forms of cutting and shaping. A typical shaping operation is by milling with an end mill. The following discussion, and much of this disclosure uses material cutting in general, and milling more specifically, as an example for discussion purposes. However, it should be understood that all shaping operations and tools suffer from the same general problems and challenges discussed in this background section. And, further, all such shaping operations and machine tools can be improved with inventions disclosed herein, which can be applied thereto. Thus, although the discussions below are generally cast in terms of material cutting, the applicant intends to cover all applicable material shaping tools and machines and operations, as well as cutting operations.

An NC code consists of a block number, a G-code, coordinates, a tool number, and a special function. In other words, the NC code is composed of two big portions; one is geometry information that represents product shape, and the other is motion information that controls the cutting tools in the CNC machine, and it turns into electrical signals to control motors in the CNC machine. There are many cases of CNC machining depending on work piece material (e.g., metal, graphite, plastics, etc.), work piece material hardness, work piece material size, industry (e.g., die and mold, parts), and so on. One of the most widely used combinations of work piece material and cutting tools uses a steel (hardness of HrC 30-35 (KP4M)) for workpiece material and OSG brand cutting tools, sold by OSG USA, Inc., of Irving Tex.

The operation is explained more fully with reference to FIG. 1, which shows schematically a generic CNC machine set up. The machine tool, for instance, a milling machine (not shown) has a work stage 102, which includes a base plate 104, to which a first, X axis stage 106 is coupled, such that the X axis stage can translate along the x axis, relative to the base plate 104. A Y axis stage 108 is coupled to the X axis stage 106 so that the Y axis stage 108 can translate along a y axis relative to the X axis stage 106 and the base plate 104. A work piece 110 is secured to the Y axis stage 108 so that it will not move while it is being shaped. It can be secured by mechanical or vacuum clamps or by some combination of both, or by any other suitable means.

A tool spindle 112 is provided with its own transport apparatus, so that it can be brought near to the work piece 110. The spindle 112 has a socket 114, which carries a shaping or cutting tool 116, for instance a milling tool, such as an end mill. Typically the spindle is arranged to spin the cutting tool 116 at a high rate, so that it can shape the work piece, such as a piece of metal. The spindle 112 thus is provided with a Z axis actuator, so that it can move along the z axis, relative to the work piece 110. The spindle typically also has actuators to actuate it along the x and y axes. Furthermore, the X axis stage is coupled to an X axis servomotor or other actuator 118 and the Y axis stage is coupled to a y axis servomotor or other actuator 120, so that relative motion along each of the x, y and z axes can be obtained between the tool 116 and the work piece 110. The spindle can also typically be actuated to rotate around the x and y axes, so that the tool can be oriented in any desired position relative to the work piece 110.

Other forms of machine tools, such as lathes, can also be CNC. In such a case, the work piece may be set in a chuck to spin around an axis of spin, and a cutting tool is held in a tool holder, which moves the cutting tool either perpendicular to the spin axis, or parallel to it. The height of the cutting tool, relative to the tool axis can be set, or adjusted, or changed under control of the computer.

The shaping of the work piece is accomplished by running the CNC machine to follow a program that dictates the tool's locations, orientations, motion from one location to another, the spindle speed, etc., all or most of which is pre-programmed so that the tool can automatically cut away material from the work piece 110 to form the desired part. The operator does not cause the tool to move by pushing or pulling or guiding it manually in any way. Thus, the operator has no tactile feel for the tool and workpiece interface, as machining progresses.

As the cutting tool cuts, it moves, and it wears down, with some part of it physically wearing away. Eventually, the cutting tool will become so worn that it no longer functions properly. In an ideal situation, the CNC machine operator will anticipate harmful tool wear, and will stop the machine and change the cutting tool before it is so worn that it fails by either damaging the forming part, or damaging itself or the machine. For the most efficient running of the machine, and thus the industrial machine center, which has many machines in its operation, it would be best that the cutting tool be changed at the right time. If it is changed too soon, then some cutting potential of the cutting tool is wasted. If too long a time is waited before changing, some damage can occur to the part, the machine, the operator, etc. Theoretically, a CNC machining center can be operated without any critical issue if operators change a cutting tool when the expected tool life has been reached or when they find any tool wear. However, too early tool changing could be wasteful. Some research has concluded that tools are not used to the useful end of tool life in 62% of applications.

If severe cutting tool failure occurs, CNC plant managers need to discard all of the defective products and rework. Reliability of the CNC plant is affected, and it may lose business. It is important to anticipate the cutting tool failure before any occurs and to act upon that anticipation. There may also be destruction of the CNC machine itself, resulting in loss of its use for a period of time, and the cost of its replacement. Operator or bystander injury, from flying metal or material parts is also a possible risk, as well as fire.

FIG. 2 shows, schematically, in graphical form, tool wear as a function of cutting time. A break-in period 202 is followed by a steady state wear period 204, followed by a rapid wear, or deterioration period 206, followed by a final failure event 208. In both theory and reality, if cutting tool wear continues during the cutting process, tool rupture can occur abruptly at a certain point in time in the deterioration period shown in FIG. 2. As can be seen, the break-in period 202 is characterized by a rapid initial wear rate. The steady state wear period 204 is characterized by a uniform wear rate, and the duration of the steady state period is relatively long as compared to the other periods. During the steady state period B04, the change in tool wear rate can be gradual, up until an accelerating wear rate in the deteriorating period 206, culminating in a failure event 208. A failure event would be some notable physical degradation of the tool, such as fracture, chipping, bending, melting, shearing, extreme wear, etc., such that the tool no longer functions satisfactorily, if at all.

It is desirable to be able to identify or predict the onset of the deteriorating period 206, ideally, before it begins. However, as seen from the graph, the beginning moment of the deteriorating period 206 is difficult to discern, being characterized by a relatively small change in the rate of wear. The operator definitely wants to be able to know to stop the CNC machine from operating before any failure event occurs, so that in fact, no failure event does occur.

The most frequent types of cutting tool failures are: significant tool wear; tool trembling; and tool breakage. Each of those is typically mainly caused by the following reasons, respectively.

Cutting tool wear can occur gradually, when a cutting tool is exposed to one of several conditions, including but not limited to: low spindle speed, high feed rate, or high tool temperature for a long period of time. Variation of work piece material hardness also causes tool wear. Even though it can be estimated by a technique known as Taylor's Equation for Tool Life Expectancy, the cutting tool life expectancy is based on theoretical calculation and, in many practical cases, it is not generally applicable because many cutting tool failures occur before a cutting tool reaches its expected cutting tool life.

There are two principal types of cutting tool wear for a milling machine cutting tool: flank wear and crater wear. For flank wear, the contacted surface of the cutting tool wears out due to friction between the tool and the workpiece and abrasion. As flank wear develops, cutting force increases significantly, affecting the mechanics of cutting. Crater wear can be caused by chips, created during the cutting process on the rake face of the cutting tool. High temperature at the rake face in which the cutting tool meets the chips that are cut from the workpiece most often leads to crater wear.

Cutting tool trembling is not a tool failure, or deterioration, per se, but it leads to deterioration, failure and/or wear. Trembling occurs when a cutting tool is attached to a cutting tool holder improperly, extending too far. Thus, a spindle picks up harmonics from the cutting tool and resonates back out onto the cutting tool cutting surface, where CNC machining is occurring.

As used herein, the term deteriorated, deterioration, or deteriorating refers to a condition of a tool when it may still be physically intact, but its condition is worn or changed so much that it is actually in the early and medium stages of tool deterioration, before tool failure, and cutting tool rupture. Thus, as used below as a term for a label for tool condition, deteriorated or deteriorating means that the tool has shown signs of abnormality significant enough, that it is no longer normal, different from trembling, which would eventually lead to a physical rupture or other disintegration of the tool, such as a fracture or chipping.

There are many reasons for cutting tool rupture and breakage, including but not limited to: continuous tool wear, trembling, inappropriate tool path being followed (either by being automatically driven by the CNC machine, or a human operator). Cutting tool breakage can cause severe damage to the CNC machine itself. Minor cutting tool breakage is likely to result in slight damage to some parts in the CNC machining center, while major breakage could cause catastrophic structural damage to the machine.

There are at least two common, different ways to detect incipient cutting tool deterioration; direct and indirect methods. There are many direct methods. Some methods are visual. An operator may recognize cutting tool deterioration by inspection through a microscope to visually see tool wear. Some methods are tactile. An operator can run a fingernail along the surface of the cutting tool to feel for irregular roughness. The operator can also check (visually or by touch) for an abnormal wavy pattern on a work piece surface. In practice, CNC operators sometimes stop the CNC machine during the machining process to check the cutting tool condition through a microscope or fingernail test. Thus these activities increase production lead time and reduce productivity, at least with respect to pure output per time spent. Thus, these methods are not ideal for the most advanced factory, which aims to have a fully automated manufacturing system without human operators. Further, such methods suffer from inevitable human errors that could lead to critical accidents because the manual methods rely on a human operator's experience and insight for detecting cutting tool failure.

Alternatively, cutting tool condition can be monitored directly by a laser probe system, but such laser inspection also requires stopping the CNC machining process to check the cutting tool condition. The laser probe mainly detects tool rupture, rather than tool wear, so it is also considered a detective control method. Therefore, the direct methods, such as manual and laser probe, are not considered as continuous real-time cutting tool monitoring systems and are not ideal solutions for the most advanced, automated factory.

Indirect methods use different sorts of sensors to detect cutting tool deterioration automatically and to prevent a catastrophic accident during the CNC machining process. For example, systems monitor cutting tool condition by measuring acoustic emission (AE), cutting force, temperature, and vibration. Among those sensor technologies, AE sensor and force/torque sensor technologies are well-known and some manufacturing plants already use force/torque sensor technologies. AE is transient elastic waves within a material, caused by the rapid release of localized stress energy. (Thus, although the word acoustic is part of its name, it is not a technique that monitors audible sounds.) An event source, such as a crack formation, or elastic deformation, releases elastic energy into the material, which then propagates as an elastic wave. The phenomenon of radiation of acoustic (elastic) waves in solids that occurs when a material undergoes irreversible changes in its internal structure. Causes of plastic deformation include but are not limited to: aging, temperature gradients or external mechanical forces. Several research papers show the effectiveness of AE signal analysis on monitoring cutting tool condition. There are however, limitations. For instance, the AE signal generated from a work piece varies depending on work piece material. Out of range AE signals are hard to separate. Rapid stress-releasing events generate a spectrum of stress waves starting at 0 Hz, and typically falling off at several MHz. Importantly, AE can detect only the ongoing cutting tool failure as it happens (rather than anticipating failure before it happens) because of the nature of the AE signal. It is also critical that the AE signals have a broad frequency range, so that an AE sensor generates too large an amount of information to process practically, as to do so would require huge processing power, which leads to inefficiency. (Acoustic emissions can be detected in frequency ranges under 1 kHz, and have been reported at frequencies up to 100 MHz, but most of the released energy is within the 1 kHz to 1 MHz range.)

Similarly, the force/torque sensor technology is widely known, but it also has a critical limitation. Even if the sensor accurately identifies cutting tool failure during the cutting process, it is highly likely to be too late to address the severe cutting tool deterioration. In other words, the force/torque sensor generally detects the late stage of cutting tool wear or the cutting tool failure at the moment when severe tool breakage is just beginning. Thus, even though the force/torque sensor detects the cutting tool failure and stops the CNC machine, it is very difficult to prevent severe cutting tool failures and, occasionally, machine parts failures.

The same deficiency (late identification) also afflicts most other sensor technologies, such as vibration and temperature sensors. Thus, the use of current sensor technologies can be considered as a detective control only, which identifies severe cutting tool failures in the late stage of cutting tool deterioration, rather than a preventive control that detects or anticipates incipient cutting tool failure in the early and medium stages of cutting tool deterioration and prevents severe cutting tool failure proactively. In addition, the known sensor technologies are relatively expensive for small and medium-sized manufacturing companies, so the cutting tool failure prevention system using an AE sensor or a force/torque sensor is unlikely to be an affordable solution for many manufacturing plants.

Another method that experienced CNC machine operators use to identify cutting tool failure is by listening for audible, abnormal cutting sounds during the CNC machining process. If they hear a significantly abnormal sound, or sound that they recognize from past experience indicates that tool deterioration is happening, or soon to happen, then they stop the machine. This method also has many limitations. It is relatively difficult to do, and thus is not available for novice, or relatively low skilled CNC operators. It is particularly difficult to identify the early and medium stages of tool deterioration, and thus it is more likely that audible methods lead only to detecting tool deterioration when the deterioration becomes severe, tool breakage happens, or when defective final products are already being produced. Also it is almost impossible for CNC operators to detect all the possible tool failures because of inevitable human errors. Furthermore, in typically noisy CNC machine centers, it is difficult to hear the sounds of any one machine tool, especially if the operator is using ear covers or other sound dampening equipment to prevent hearing loss. Additionally, one operator cannot monitor more than one or at most several machines, personally. Thus, audible detection by human operator is not an automatable method, and is labor and human operator intensive.

Another limitation of human operator monitoring and evaluating of the audible sound of operating CNC machines is that acquiring this ability takes significant experience, not only in general, but with each different machine (for instance a lathe, a milling machine, and end mill, a side mill, a saw, a drill press, etc.) and even with each differently shaped part or different work piece material. Thus, use of such a method cannot be had immediately upon beginning the manufacture of a specifically designed part for the first time.

Because the current sensor technologies are ineffective and inefficient at preventing cutting tool failures, small and medium-sized manufacturing companies, desire more advanced but affordable technology that can prevent the cutting tool failure in the early and medium stages of cutting tool wear automatically.

Thus, there is a need to be able to anticipate, or sense or detect tool deterioration before it becomes too late to stop the machine before the tool fails, or breaks. A further need is to be able to anticipate or sense such incipient deteriorating tool condition using technologies that are modest in cost and complexity, so that they can be used by the many small machine facilities around the world. Another need is to be able to anticipate or detect incipient tool deterioration automatically, without the need of an operator to check each machine for deterioration. Yet another need is to be able to anticipate or detect incipient tool deterioration in the dirty, noisy, busy conditions of large and small CNC machine centers. Still another need is to be able to anticipate or sense incipient tool deterioration for all or most of the many different types of CNC machines, tools, and work pieces, alone, and in combination. Still another need is to be able to anticipate or identify incipient tool deterioration without stopping the machine to inspect the tool or the work piece, either directly or indirectly.

Thus, an object of an invention hereof is to be able to anticipate or sense or detect incipient tool deterioration before it becomes too late to stop the machine so that the tool does not break. A further object is to anticipate or sense such incipient tool deterioration using technologies that are modest in cost and complexity. Another object of inventions hereof is to anticipate or detect incipient tool deterioration automatically, without the need of an operator to check each machine for failure. Yet another object is to anticipate or detect incipient tool deterioration in the dirty, noisy, busy conditions of large and small CNC machine centers. Still another object is to anticipate or sense incipient tool deterioration for all or most of the many different types of CNC machines, tools, and work pieces, alone, and in combination. Still another object of inventions hereof is to anticipate or identify incipient tool deterioration without stopping the machine to inspect the tool or the work piece, either directly or indirectly.

These and other objects and aspects of inventions disclosed herein will be better understood with reference to the Figures of the Drawing, of which:

BRIEF SUMMARY

Figure 1:
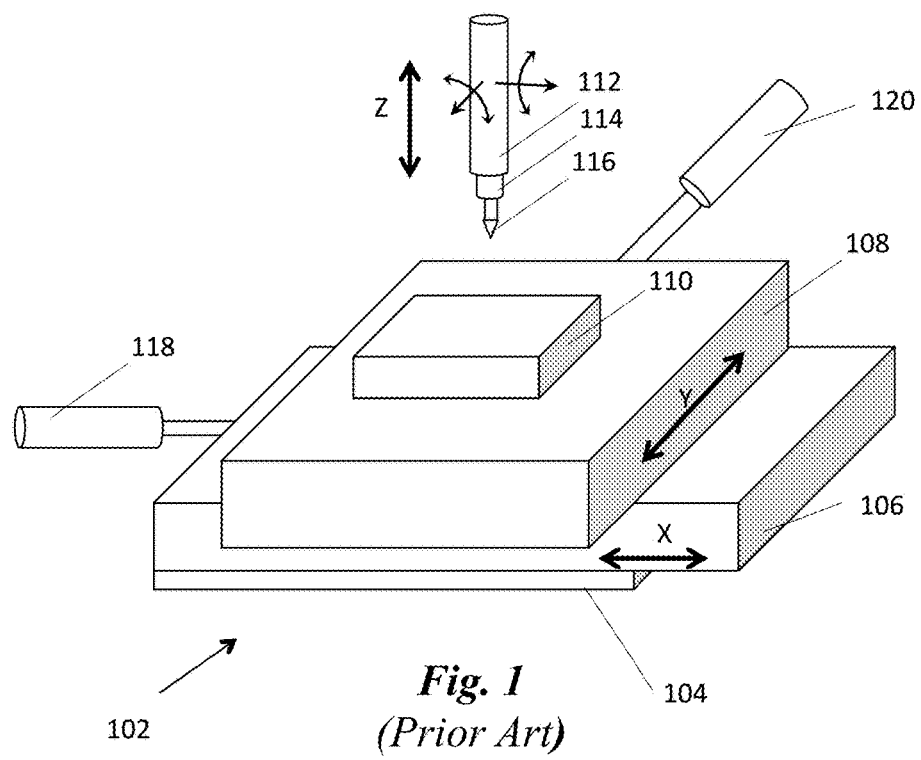
FIG. 1 is a schematic representation of a work stage of a prior art CNC machine tool, showing a work piece, tool, spindle, and X and Y stages.
Figure 2:
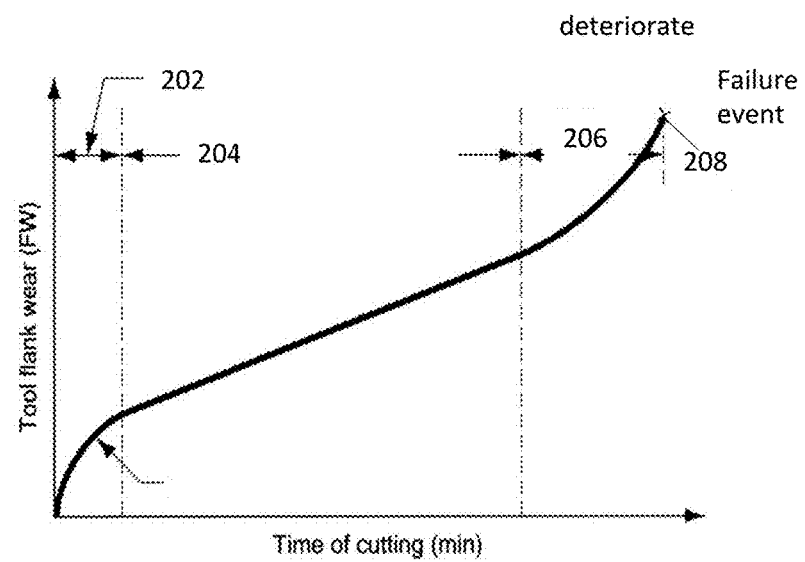
FIG. 2 is a graphical representation showing typical cutting tool wear as a function of cutting time.

According to a pattern generating aspect of an invention hereof, for a given type of CNC machine and machine cutting tool, sound files recording human audible sounds can be created as a machined part is made by operating the machine with the cutting tool. The sound files can be labeled according to a category of operating condition to which they correspond, for instance normal, trembling, and deteriorating. (More than or different from these three are possible.) Ambient noise can be removed from the signals of the sound files, typically by creating a noise profile of the environment in which the machine operates, at a time when the machine is not cutting a part, but everything else is otherwise the same as during operation, and then removing sound that matches the ambient noise profile from each sound file. Audio features that relate to cutting can then be extracted from the information, and used, as discussed below.

According to one method, the sound information is in the form of a time-wise sequence of .wav files. (Appropriate sound files of other formats than .wav files, as now existing or developed in the future, may alternatively be used.) Each .wav file can be divided into a number of frames of a relatively short duration. From each short duration frame, a number of short-term features can be taken, for example, numbering thirty-five. The short-term features can relate to both the time-domain and the frequency domain of the sound files. Examples of short-term features include but are not limited to: zero-crossing rate, entropy of energy, energy, spectral spread, and many more. A number of short duration time frames can be combined into a medium duration time frame unit, referred to herein as a mid-term unit of time.

Over the course of each mid-term unit of time, for each of the short-term features, statistical combinations of the values of the short-term features can be taken over the duration of the mid-term, to generate mid-term features. A typical, illustrative but not limiting set of statistical combinations may include some or all of: mean, median, standard deviation, standard deviation by mean, maximum, and minimum of the values of the short-term features over the duration of a mid-term.

As an example, if there are thirty-five short-term features, and there are six statistical combinations, then there would be 35×6=210 mid-term features. These features are typically numerical. For each mid-term segment of time over the duration of the operation of the machine, it is convenient to refer to the corresponding portion of the information as a vector having n, in this example, n=210, elements.

Thus, from the sound files generated during the operation of the machine, a sound reference information set can be created that is composed of a series of vectors of numerical values for each of 210 features. It will be recalled that the sound files over time had been labeled with a category, in this example, normal, trembling, and deteriorating. Because each mid-term duration corresponds to a time period that has been labeled, then each vector of numerical values, each of which corresponds to a different mid-term feature, can also be labeled by the tool condition label that corresponds to the time period at which it arose. Thus, each vector can also be labeled.

Still continuing with a brief description of the pattern generating aspect of an invention hereof, it is typically true that many of the 210 mid-term features embody similar information regarding which cutting tool condition label corresponds to the numerical values for the feature. In other words, it is typically so that some of the 210 features correspond closely to each other, and thus provide redundant information, such that it is not necessary to monitor the values for each of the redundant pair (or larger plurality than a pair) to determine which tool condition label should be applied to the sound file for the duration of time in question. Thus, the number of features, also known as the dimension of the group of features, can be reduced to a smaller number of items. Those items in the reduced set are referred to herein as principal components.

Principal components are generated by applying a principal component analysis to the 210 mid-term features, combining the mid-term features in different ways, analyzing the combinations, to recast the information embodied within the relatively large number of mid-term features into a relatively smaller number of principal components. (There are fewer principal components than there were mid-term features, but each principal component is generated by taking into consideration each one of the 210 mid-term features. Each principal component is the result of a different expression that can be the result of a different linear combination of the values of all 210 of the mid-term features. It has been determined that a much smaller number of principal components, for instance thirty-two, can account for virtually all of the variability that is found in the 210 mid-term features. Each principal component is obtained by evaluating a specific 210 term expression, which does require some computation. But, the end result is thirty-two numerical values. These thirty-two numerical values then represent the audio information that is embodied in the 210 mid-term feature values. Thus, it is much easier to evaluate the thirty-two PC values for any one mid-term time frame, than to evaluate the 210 mid-term values.

Typically, because normal operation is more common than abnormal operation, such as trembling and deteriorating, the sound information set, composed of vectors of values that relate to mid term features will not be balanced with respect to the number of vectors that are labeled normal, as compared to the abnormal categories, in this case of trembling and deteriorating. If such an unbalanced information set were used to generate patterns of values for subsequent use, the rules and patterns generated would be biased and provide poor results. Thus, it is most beneficial to balance the information set during the pattern generating aspects of inventions hereof. Various methods of balancing are discussed, and one in particular, called the SMOTE method, is shown to be very useful.

Continuing with this brief description of a pattern generating aspect of an invention, a classification method is selected. A classification method has two aspects. The first is used during the pattern generating aspect of an invention hereof, and the second is used during a pattern matching aspect of an invention hereof, discussed below. For the pattern generating aspect, the classification method generates rules, which dictate how to examine audio information related to cutting tool condition, and how to assign a cutting tool condition label to audio information for a particular slice of time. This may be thought of as a rule or/and pattern generating method.

For the pattern matching aspect, the classification method applies the previously generated rules to audio information related to a cutting tool being used in an industrial setting. The classification rule application method applies the rules to the audio information, which application of rules generates as an output, a tool condition label (which, in this example, is one of normal, trembling, deteriorating) that is used to determine whether to allow the machine to continue cutting, or whether it should be stopped, because the audio information matches audio information of the type that indicates the tool is in either trembling or deteriorating condition.

For the rule generating aspect of the classification method, the audio information for each mid-term time frame of a balanced principal component information set, along with the operator assigned label, is analyzed using known methods, by applying many different classification techniques. Each different classification technique generates a different set of rules as to how to compare, contrast, combine, etc., the various aspects of the audio information, which in the example discussed, amounts to values for thirty-two different principal components, and the tool condition label. After each classification technique has generated its rules, then each classification technique is applied to use its rules on a set of audio information, about which the appropriate labels are known, based on human operator assignment. The outcome of each classification technique, meaning the label that it would assign, using its rules, is compared to the labels that a human operator previously assigned to the same slice of time, and the accuracy of each of the various classifier techniques is determined (assuming that the human operator's assignment is correct). One or more (but typically only one) classifier technique is then chosen to be used in the pattern matching aspects of inventions hereof. The pattern matching aspects of inventions hereof use similar steps and components to those used with the pattern generating aspects of inventions, however the steps and components are used in a different context.

Also, the patterns of audio information embodied in the values of the individual principal components for each of the many individual slices of time (after balancing), each of which also has associated therewith, a tool condition label, are established as a balanced reference principal component information set of patterns for a particular cutting tool and machine and part combination. It is useful for some discussion purposes to establish the concept of a job. A job is a combination of CNC machine, shaping tool and the specific part to be made. This reference principal component information set is used in the pattern matching aspect of an invention hereof discussed below. Patterns in the sound information collected in an industrial setting are matched to patterns within the reference principal component information set.

Consideration of a simple example of what is meant by such a pattern, and a rule applied to patterns, is instructive. It may be that if the values of three specific individual principal components in a vector that represents a mid term duration of sound exceeds a certain threshold for each principal component, then it is always the case that the label associated with any such set of principal component values in the reference principal component information set is trembling. Thus, the pattern is any moment of time for which the set of principal component values of those three components exceeds the threshold and the rule is to assign the trembling label to any such slice of time.

In fact, a further reduction can be had in the amount of information that must be used to identify and classify an audio signal for a particular slice of time with one of the cutting tool condition labels. The foregoing discussion contemplates principal component vectors, which in this example comprise thirty-two elements for each mid-term frame. Some classification methods happen to work best by evaluating fewer than all of the thirty-two principal components. The number of fewer principal components ranges in this example from six to thirty-one. Or, to put it another way, for some classification methods, some of the principal components are not useful. Thus, it is possible to further reduce the amount of necessary information to be considered from the reference set of principal components to a set of fewer selected items. These reduced subsets of principal components are referred to herein as selected principal components.

In subsequent use of the signal information, only these selected principal components are used. The unselected (meaning, all but the selected) principal components are either not used, or, in some cases, not generated.

Thus, the pattern generating aspect of an invention hereof results in a balanced reference principal component audio information set that relates numerical values of sound related items (the principal components (either natural, or selected) to a cutting tool condition label, such as normal, trembling, or deteriorating. Thus, one can think of the balanced reference principal component information set as a matrix of rows and columns. Each row corresponds to a duration of time, characterized by a cutting tool condition and values for each of the principal components. Thus, each row also corresponds to a temporal period, which could be traced back to a duration equivalent to a mid-term time frame. The rows are typically arranged in an order that corresponds to the time-wise sequence of moments in time that they were generated. Each row may also be thought of, and may be referred to herein, as a vector. Thus, a vector is identical to a row in a matrix, and corresponds to a specific moment/duration of time.

Each column, which in this example number thirty-two columns, represents a different one of the principal components, with each element in the column representing that specific principal component at a specific temporal period. Each principal component is defined by a single numerical value for each temporal period.

To recap what has been described above, for each temporal period, or row in the matrix, each principal component, (each element in the matrix row (or each element in the vector)) in this example numbering thirty-two, is created by evaluating a multi-dimension expression (in this example 210 dimensions), where each dimension represents one of the mid-term features (in this example numbering 210). The mid-term features, were generated based on statistical evaluation of a plurality (in this example thirty-five) of previously generated short-term features), some of which are time-domain items and some of which are frequency domain items.

Thus, each set of up to thirty-two numerical values in the information set is matched with one of the tool condition labels, in this case the three labels of normal, trembling, deteriorating, to form what can be thought of as a vector.

The final result of the pattern generating aspect of an invention hereof is a reference audio information set, which can be in the form of a matrix, or patterns. Each row of the matrix also can be thought of as a vector. Each row/vector represents a mid-term duration period in time. Each vector constitutes a pattern of numerical values of the principal components (e.g. numbering 32), and a single tool condition label (e.g. normal). The set of patterns is thus generated. One such set of patterns can be generated for a specific combination of cutting tool, machine, part type (such a combination also being referred to herein as a job). Another such set of patterns can be generated for a different job. A cutting tool or machine manufacturer would generate such an information set for each of its typical jobs (combinations of tool/machine/part). These could be provided to purchasers and users of its machines. Each user may also have to further process information to use the information set in its specific facility, as discussed below.

The following discusses, in summary form, a pattern matching and tool condition assessing aspect of an invention hereof, which is used in an industrial CNC machine tool operating environment, such as a machining center. In the machine center, sound is recorded and audio files, such as .wav files are generated. Ambient noise apart from the cutting sounds can be removed from the sound files, although it need not be. However, better results are typically obtained if noise is removed. The audio files are divided into smaller audio files, each of which represents a short-term time-frame, from which values for time domain and frequency domain features are measured. Information from a plurality of short-term frame files are combined to constitute a mid-term frame file. The values for the short-term features are combined so as to generate values for corresponding mid-term features, and the values for all such mid-term features are generated from those of the corresponding short-term features.

In a typical example, there can be two hundred and ten mid-term features. The values for the mid-term features for any specific time frame of mid-term duration are used to generate values for a smaller number of principal components, which relate to the single mid-term frame under evaluation. In a typical example, there can be thirty-two principal components. From these principal components, the lesser number of selected principal components found to work best for a specific classifier method can be used. Thus, for each mid-term duration of time, a set of select principal component values is obtained, which set can be thought of as a vector, or a row of information. Thus, the vector constitutes a set of numerical values, which numerical values make up a pattern of numerical values.

The pattern matching method operates in real time, generating and working with one mid-term time frame at a time to assess the tool condition associated with that mid term duration of time. Thus, for the pattern matching method, a large matrix of information spanning a large period of time is not created. Instead, a stream of smaller information items that are more properly considered as a single vector, or a matrix of one row only, is created, representing one mid term duration of sound after another. If normal operating conditions are found, the method returns and is conducted throughout again, on the subsequent in time mid-term time frame of sound information. If other than normal operating conditions are found, the method stops the machine.

The same classification method that was used to generate the rules for use with the balanced reference audio information set of patterns and labels, discussed above for the pattern generating aspect of an invention, is applied to a single vector of patterns of numerical values of selected principal components at a time. The apparatus that applies the classification method is called a classifier. The classification method compares the pattern of numerical values, for every specific mid-term duration of time, as time passes, to the many, many patterns of similar information in the balanced reference (principal component) audio information set. As a result of the comparison and application of its rules, the classifier, applying its classification method, classifies the information of that frame of mid term duration with one of the tool condition labels, in this case normal, trembling, and deteriorating. Then, if the matched label is for other than normal—that is, for trembling or deteriorating, the system generates a signal for the CNC machine to stop, because it is likely that the tool would soon break if operation continued.

This concludes the summary description of the significant aspects of inventions hereof. A detailed description follows. This detailed description covers the same general concepts, but in more detail. Thus, it is necessarily repetitive in general outline, and in some details. However, much more detail is provided.

DETAILED DESCRIPTION

Pattern Generating Method and Apparatus

A detailed discussion of the various aspects of inventions hereof follows. One aspect of an invention hereof is a method for generating patterns of audio signal information derived from human audible sounds made by a CNC machine while operating, which patterns correlate highly to a condition of the cutting tool that is known to very often, if not always, be followed by shaping tool failure after a brief period of time, if the machine is allowed to continue running. Thus, these generated patterns can be used to anticipate that tool failure would be likely to occur, before any tool failure occurs (so, in fact, it does not occur), so that the machine operator can stop the CNC machine from operating. Thus, the method can be used to stop the machine at the onset, or shortly after, onset of shaping tool deterioration.

As is mentioned above, there are many types of shaping operations and shaping tools. Shaping operations and tools include, but are not limited to: milling, drilling, lathe-turning, sanding, grinding, sawing, and other forms of cutting and shaping. A typical shaping operation is by milling with an end mill. The following discussion uses material cutting in general, and milling more specifically, as an example for discussion purposes. However, it should be understood that all shaping operations and tools suffer from the same general problems and challenges discussed in this background section. And, further, all such shaping operations and machine tools can be improved with inventions disclosed herein, which can be applied thereto. Thus, although the discussions below are generally cast in terms of material cutting, and in some cases, milling, the applicant intends to cover all applicable material shaping tools and machines and operations, as well as cutting operations.

This method will first again be summarized, and then discussed in more detail with respect to suitable apparatus that can conduct the method steps, and the method steps themselves. Human audible sound is recorded, and is saved in files, each of which represents a frame of time of a fixed, small duration. An experienced human operator observes the operation of the CNC machine and cutting tool as it is being used to shape and/or cut a work piece. The operator indicates by labeling what s/he hears periodically with one of several cutting tool condition labels. In an example used herein, s/he selects from normal operation, trembling operation, and deteriorating operation. Normal is the typical sound.

Trembling arises when a tool, such as a milling tool, is not positioned properly in its socket or chock, typically extended out too far, or loose, and so it vibrates to some extent undesirably. The vibrations cause irregularity in the cutting action, and may eventually be magnified, due to harmonic motion, etc. and cause problems with machine operation. Trembling may resolve and go away, or it may persist such that the machine should be stopped to correct the problem. It is important to note it, however.

Deteriorating represents a variety of sounds that include, of course the sound of catastrophic breaking, but that sound is to be avoided entirely. Thus, it is best to think of deteriorating as sounds that precede and might ordinarily, if nothing is done, lead up to what, in the operator's experience, would lead to a catastrophic tool fracture, or cracking, or other physical disintegration, but something short of the catastrophic tool failure sought to be avoided. It is also reasonable to include in the category of deteriorating, sounds of tool wear that are so significant that even though there may be no catastrophic cutting tool breakage event, the cutting tool is unable to properly shape the part being made.

Thus, each frame of time of sound files is labeled with a characterization of cutting tool condition. The sound signals are then transformed, first by analyzing them for short-term time domain features, and also by transforming them into their frequency domain, and analyzing them for short-term frequency domain features. The combined short-term features are then combined over longer durations, called mid-term durations, and mid-term features are identified for each frame of mid-term duration. All of the audio related information for at least one machine cutting session is collected into a reference audio information set. This can be done for many different cutting sessions, or perhaps for only one. The more information that is evaluated, up to a point, the better will be the resulting reference information set. The labeled audio information is transformed into more efficient sets of reference information, which are then analyzed to generate a set of audio related information. (Audio information and sound information are used interchangeably herein.)

The reference information can be thought of as a set of vectors, (also referred to herein in some instances as records), each vector for a frame of time, each vector having a plurality of numerical value entries, and a label for the tool condition, normal, trembling, deteriorating, etc. The invention identifies patterns of relations of the numerical values for each of the entries in a vector, and which of such patterns relate to which category of normal, trembling, deteriorating, etc. The system can do this because the human operator has labeled the audio files, which have then been transformed into the more efficient audio related form that pattern matching and identification apparatus and methods can be used to identify common aspects of the vectors that have been labeled normal, etc., so that when such common aspects are present in heretofore new vectors of independent audio related information, these new vectors can be labeled by the system according to the patterns that it has identified.

To use such a system, audio related information collected and analyzed in real time as a CNC machine tool is being used in an industrial machining center to fabricate a part from a work piece is compared to the reference information set of patterns of audio related information. Pattern matching and identification classifier methods are applied to the information, and labels are generated for each time frame of information as they are created. If the label that the system generates based on its pattern matching is normal, then nothing happens. If the label is deteriorating, then the system signals that the CNC machine should be stopped. If the label is something else, such as trembling, then the action taken would depend on what the label, such as trembling, means for that machine. It might mean that careful observation is necessary, but that stopping the machine is not necessary unless the trembling continues for a certain duration of time. Or, it might mean that the machine should be stopped.

As is the case with many modern signal analysis inventions, which involve signal (e.g., sound) apparatus, signal processing apparatus (e.g., analog to digital converters, programmed general purpose computers, specialized signal processing hardware) output devices (e.g. computer monitor screens, audible signals, such as bells and buzzers, interfaces with machine tools, such as kill switches), analog information—specifically, human audible sound information, is analyzed, recorded and then digitized. In this case digitization takes at least two different forms, including normal digitization of analog information with representations (akin to how text is somehow represented in digital form), and also, by taking a spectral analysis (frequency domain) of audible sound. Then the digital information is turned into a set of information in the form of matrices, with rows (also called vectors) and columns. The entries in the matrices are reviewed, analyzed, augmented, manipulated, and then used to identify patterns in digital embodiments of audio signals, represented by numbers. The patterns are then used to analyze other audio signals, which are recorded in an industrial machine center as real world, audible sound signals, and then digitized so that they can be analyzed for patterns that they reveal. Those patterns can be compared in highly complex manners to the patterns identified in the earlier phase of the invention, to find patterns that relate to real world conditions of physical tools making the sounds.

Thus, although many aspects of the inventions relate to data and information analysis, and data and information manipulation, at all times the data and information has a definite relation to real, analog, physical things—namely human audible sounds made by metal tools cutting metal parts. Further the analysis and manipulation of the data and information that relate to the sound signals are steps that would be impossible for a human ever to do, no matter how much time, and how much skill in arithmetic, calculation, etc. The human had. This is because the sound signals are analyzed in the time and frequency domains for features that humans cannot discern, or appreciate, such as—zero-crossing rate, entropy of energy, energy, spectral spread, and mean, median, standard deviation, standard deviation by mean, maximum, and minimum, of each of the foregoing. Thus, although the terms data and audio or sound information set and matrix and rows and columns and vectors are used to efficiently and compactly describe the form to which the sound related signals have been transformed and are being manipulated, this exercise is far from merely a data manipulating, arithmetic or numerical exercise that is nothing more than voluminous calculation that could be done by humans with an infinite amount of time and paper upon which to write calculation. It is a totally impossible task for humans to do.

Further, although human operators do identify audible sounds as normal, trembling, deteriorating, etc., they do that based on totally different means than inventions disclosed herein do. The human operator makes determinations based on a gestalt appeal to experience, and the indescribable effects of the analog signals as a whole have on the human operator's auditory system and memory, at the same time being obscured and masked by noise, artifacts, and other distractions.

With this summary in mind, more detailed review of the apparatus and method steps of inventions hereof continues below.

Figure 3:
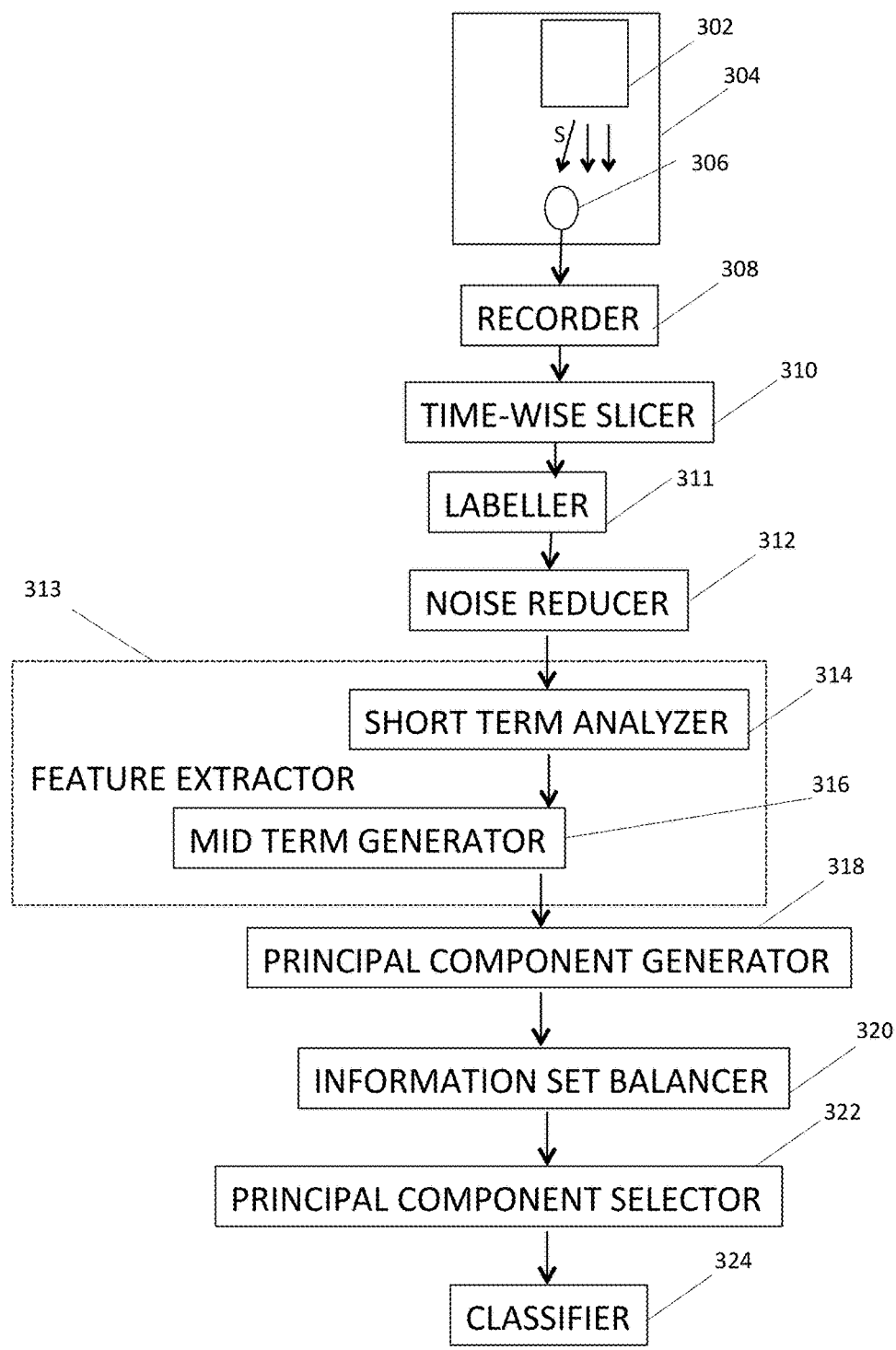
FIG. 3 is a schematic representation in block diagram form showing hardware equipment and signal and information analysis equipment of an invention hereof for generating a reference information set that can be used to anticipate incipient CNC machine tool deterioration.
Figure 4:
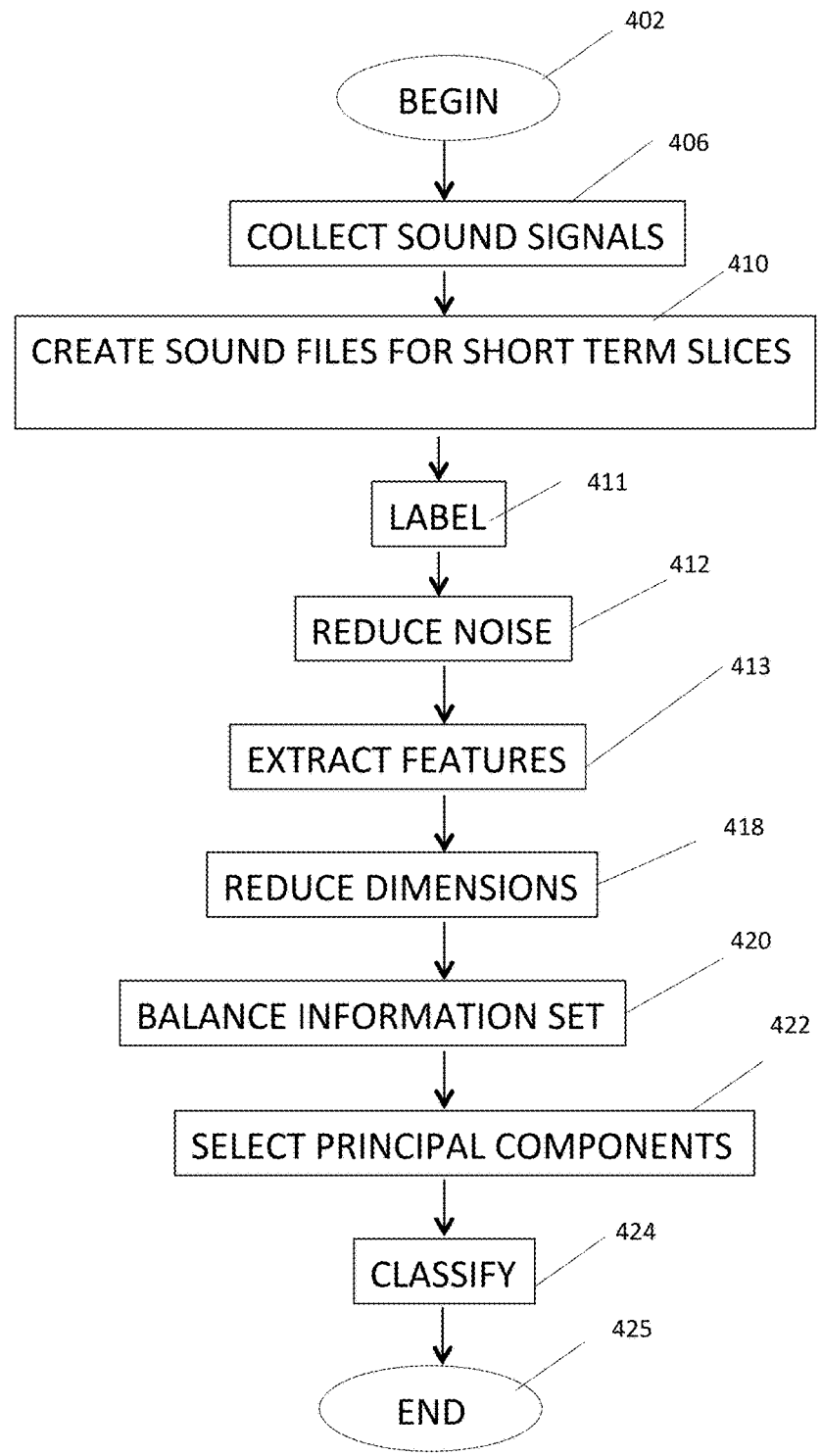
FIG. 4 is a schematic representation, in flow chart form, of a method of an invention hereof for identifying patterns in sound files that are highly correlated to the condition of cutting tool wear, which can be performed using the hardware shown in FIG. 3.

FIG. 3 is a schematic representation in block diagram form showing hardware apparatus and signal and information analysis apparatus of an invention hereof for generating a reference set of audio related information, which includes patterns of information that can be used to anticipate incipient CNC machine tool deterioration and failure. FIG. 4 is a schematic representation, in flow chart form, of a method of an invention hereof for generating a reference information set of patterns that derive from audio files that are highly correlated to the condition of cutting tool wear. FIGS. 3 and 4 are described below in parallel.

Turning first to FIG. 3, a CNC machine tool, for instance a computer numerically controlled end-milling machine 302 is situated in a machine shop room 304, which may or may not contain other fabricating machines, and other sources of audible noise. A general-purpose microphone 306 is arranged so that it can collect (step 406, as shown in FIG. 4) human audible sound (audio) signals S that are generated in the workshop room 304 in the general vicinity of the CNC machine 302. (The term audio is used herein to mean human audible sound. Thus the terms audio and sound are used interchangeably herein.) Thus, the process begins 402 with a sound collection step. The microphone 306 is coupled, electronically to a sound recording device 308 capable of recording and archiving and later replaying the audio signals captured by the microphone 306. The microphone is a general-purpose microphone, because the desired sound to be captured is that in the human audible frequency range. This is generally between twenty Hz and 20,000 Hz, although of course the range is only approximate. Typically, the audio can be recorded in the time domain, for a series of periods of time of a specified duration, referred to herein as frames of time, as waveforms, in a format known as .wav file. This is an analog signal, basically showing the amplitude of the sound at any instant in time, over time. Any other suitable audio file format may also be used.

A typical manufacturing duration associated with one cutting tool path is approximately sixty minutes or less. For purposes of establishing a reference information set of patterns, a reasonable sound collection routine is to record .wav format at intervals of ten minutes, with a sampling rate of 44,100 Hz, and a quantization of 16 bits. With the hardware used for this example, this results in .wav files of ten minutes duration, each sized at 50 MB of data. The .wav files can be recorded continuously, one after the other, each for a duration of ten minutes. Thus for a sixty minute machining session, six .wav files would be collected during normal operation. This has been found to be adequate to characterize the audio signals generated during normal operation.

Situations such as trembling can be created by intentionally setting up the tool improperly, so that it trembles, and sampling those sounds at the same rate of 44,100 Hz. To record sounds that relate to tool deteriorating, artificial situations can be established, such as by using already worn tools, or normal operation can be conducted until tool deterioration is noted due to other signs, such as recognizably unusual sounds, sparks, oil misting, odors that relate to high temperature, visual inspection of the forming part showing signs of improper tool function, etc.

The waveform files are either sliced 410 (FIG. 4) into time-wise frames of uniform length by a slicing unit 310 (FIG. 3) (also referred to herein and in the figures as a time-wise slicer) or they are created in such frame size units. A typical length of time for a single frame is 0.05 sec.

The recording device is able to save each of the recorded .wav files for each frame of time (after slicing), and also to record with each .wav file an associated tool condition category label. The labeling step 411 (FIG. 4) is conducted by an experienced human operator who uses a labeler 311 to label the .wav files associated with a specific duration of time with a tool condition label chose by the human operator.

In general, audio information S contains significant noise, artifacts, and outliers, which can lead to significant masking of the desired cutting tool condition signal, which is the sound of the CNC machine tool 302 in question. As used herein, an artifact is a sound that resembles a relevant cutting tool condition sound but, actually, is not related to the cutting tool. As used herein noise is a kind of randomly distributed signal, which does not have any information, so that it makes other features obscure. Thus, making a noise-robust system is important to being able to identify and generate audio signal patterns that relate to cutting tool failure.

Several options exist for reducing signal noise. Linear filters, including wavelet-based thresholding, and Butterworth low pass filters, reduce the noise sufficiently, but those have problems when filtering out a signal that has sharp edges and impulses of short duration. Thus, such filters might eliminate not only noise but also normal cutting tool sound. Thus, they are not optimal for detecting cutting tool failure sounds. With proper care, they might be used if necessary, but it has been determined that it is preferable to use a noise profile for noise artifact reduction instead of using linear filters.

Thus, the microphone 306 is used to record audio information in the room 304 when the CNC machine 302 is not cutting. This recorded, non-cutting sound is used to generate a profile of noise and artifact, non-cutting sounds that will be collected during operation of the CNC machine, but which are not of interest for anticipating failure of the cutting tool used in the CNC machine, but rather which are due to extraneous room noise and noise from other machine operating sources. This noise profile is used to subtract out the unwanted noise signal from the intended total signal of CNC machine cutting+noise. A noise reduction step 412 (FIG. 4) can occur in a noise reducer 312 (FIG. 3). More detailed discussion of the noise reduction steps 412, which take place in the noise reducer 312 is set out below.

A feature extractor 313 is coupled to the noise reducer 312, and takes the noise reduced signal and extracts 413 useful sound related features from the noise reduced signal.

In high-level view of the step of extracting features 413, each .wav file experience two different processes, one called a short-term process, conducted by a short-term analyzer 314 and the other called a mid-term process, conducted by a mid-term analyzer 316. These two processes (and their attendant processing hardware elements 314 and 316) are used for the present inventions, because they are used in one of, if not the most common overall known processes used for feature extraction in a field that is totally unrelated from CNC machine tool operation. That unrelated field is the field of characterizing audio information in the many music preference analyzing systems and services, for instance Pandora Internet Radio, operated by Pandora Media, Inc., of Oakland, Calif. and Spotify, produced by Spotify AB, of Stockholm, Sweden, etc. They are described in general in (Giannakopoulos, Smailis, Perantonis, & Spyropoulos, 2014). (Full citations to all articles and items referred to herein appear below, preceding the Claims, following the Aspects section.)

These processes will be explained briefly here, and then in more detail below. During the short-term process, each .wav file is divided into several slices, which slices are composed into frames. The frames can simply coincide with the sequentially ordered slices, or they can be composed of frames, formed from the slices. For instance for slices having a duration of 0.05 sec., each frame could simply correspond to each slice, formed sequentially, one after another. Or, each frame could be based on a composite of two or more successive slices. For instance a frame could be characterized by a frame size duration of 0.05 sec. and a step of 0.025 sec. (In some cases, the frame duration is referred to as a window duration.) (By a step, it is meant that each successive frame duration is 0.05 sec, but that there is an overlap in the time origin of the original sound information that is contained in each successive frame. The overlap is called the step, and in this example the step is one-half the duration, and so in this case the step is 0.025 sec.) The duration can be longer or shorter, as can be the step.

The short-term features are extracted from each frame in a short-term feature extractor 314. The most widely used short-term features in the general field of audio analysis are described in (Giannakopoulos & Pikrakis, 2014) (Theodoridis & Koutroumbas, 2008) (Kim, Moreau, & Sikora, 2005). These features also are effective for use in CNC machine tool failure analysis. The short term features are described in detail below and in connection with FIG. 5. They are of a type that includes but is not limited to: zero-crossing rate, entropy of energy, energy, spectral spread, and many more. In a useful embodiment of a method invention hereof, thirty-five different short-term features are identified and measured.

Thus, for each short-term frame of time, an output of the short-term analyzer 314 is a signal that has thirty-five elements, one each of each of the thirty-five short-term features. Some of these features are of the signal's time domain (amplitude and time related) and others are of the signal's frequency domain.

After extracting the short-term features, mid-term features (Giannakopoulos & Pikrakis, 2014) are determined in a mid-term feature generator 316, by calculating statistical attributes of some or all of the thirty-five short-term features for a frame. A typical mid-term frame window duration size can be 2.0 sec., and can have a step of 1.00 sec., with window and step being similar to those terms as used in connection with short term frames, discussed above. Thus, a mid-term frame can be made up of twenty-four short-term frames, but more or fewer are also possible. These statistical attributes are discussed in more detail below, but they can include but would not be limited to: mean, median, standard deviation, standard deviation by mean, maximum, and minimum, of each of the thirty-five short term features, for each mid-term frame. Thus, because for each mid-term frame, six statistical operations are conducted on thirty-five short-term features, a total of 6 times 35=210 (two hundred and ten) mid-term features are generated according to this embodiment.

Thus, an output of the mid-term feature generator 316 and a mid-term feature generator step is an information set, which, for each frame of mid-term duration (of for instance 2 seconds), has two-hundred and ten elements. Thus, the information set can be thought of as a stream of vectors, or rows of a matrix, one row for each mid-term unit of time, which matrix has two hundred and ten columns, one column for each mid-term feature. Such an information set is referred to herein as a reference information set, because it is referred to by later steps in inventions described herein.

Analysis of a signal that has so many elements (two hundred and ten) for each relevant time unit, has drawbacks and is not optimal. Thus, It is very important to reduce information dimensions by applying 418 (FIG. 4) some dimensionality reduction technique. This is because fewer dimensions can lead to a simpler final method with less complexity in computation and information and processing needs and more general properties. In other words, the use of a sufficiently low dimensionality affects the predictive power of the final set of patterns. It is also important for making a noise-robust system. In dimensionality reduction, it is important to keep the discriminatory information and to reduce dimensionality among the feature vectors at the same time (Osuna, 2002). Thus, features that make huge gaps between classes while making relatively small variances in a class should be preserved. (This is explained in more detail below.)

One known method of dimensionality reduction is principal component analysis, which can be conducted in a principal component analyzer 318 (FIG. 3). Thus, a Robust principal component analysis (PCA) would be a good technique for identifying useful features, because the PCA makes it possible to determine which features have huge potential of discriminatory power by looking at linear transformation of the feature vectors (Xu, Jin, & Guo, 2006). It should be noted that Robust principal component analysis is a specific modification of the well known statistical procedure of principal component analysis (PCA) which works well with respect to grossly corrupted observations. The word robust is being used in this case to specifically refer to this known technique, not to simply indicated that the technique is useful and durable and relatively immune to error (although it is also all of that). Dimensional reduction and principal components are discussed in more detail below.

Thus, the mid-term feature information is provided to a principal component generator 318, which generates as its output an information set that has fewer dimensions than the two hundred and ten of the mid-term features. As an example, it has been found that a thirty-two principal component information set can provide very good results. This will be discussed in detail below. The thirty-two principal components of each time frame are related in some definite way to the two hundred and ten features for the same time frame. For instance, each if the thirty-two principal components may have a numerical value that is determined by evaluating an expression with two hundred and ten coefficients, each coefficient being applied to the value for a respective one of the two hundred and ten mid-term features. The two hundred and ten coefficients for each of the thirty two principal components typically differ from the coefficients for each of the other thirty-two principal components.

The information set being generated is used to identify patterns that relate to each of the labeled cutting tool conditions, in this case normal, trembling, and deteriorating. It is known that an optimal information set for use identifying such patterns should have a relatively balanced number of examples of each of the categories to be discerned. There need not be an equal number, but their respective occurrences should be within some range of variance. Due to the nature of the cutting tool conditions under investigation, if the reference sound information is generated by normal operation of CNC machine tools, with properly situated cutting tools, then the instance of examples of information that is derived from sounds that occur during normal operation will vastly outnumber examples derived from sounds that occur during trembling and deteriorating operation.

There are known techniques for countering the effects of such information imbalance, and they involve using an information set balancer. An information set balancer 320 transforms the information set to counter the fact that information sets collected as described above are often imbalanced because one of the categories of information typically normal operation, appears in much higher instances than the others, and perhaps one, typically deteriorating operation, in significantly lower, fewer instances. This will be explained below, but it is only necessary to know at this time that a balancer 320 reduces these problems by balancing 420 the information set used to generate the patterns that will be of interest.

The balanced information set signal then passes to a principal component selector 322, which performs a principal component selection step 422. (In known fields of classifier use and pattern matching, this step of principal component selection may be called feature selection. However, because the term feature is used herein in connection with the short term features and the mid-term features, discussed above, and because the items that are being selected are referred to as principal components, herein, the phrase principal component selection is used herein, to mean the methods and apparatus discussed below.) Selecting principal components 422 differs from reducing dimensions 418 and the principal component selector 322 is different from the principal component generator 318. The latter accomplishes a reduction in dimensionality, for example, of the two hundred and ten mid-term features, to thirty-two principal components. The dimensionality reduction methods generate a new set of elements in a new element space (the principal component space, in this example) that is typically of lower dimension (thirty-two) than the original space (the mid-term feature space, in this example two hundred and ten dimensions). In other words, the dimensionality reduction step creates a new combination of elements. These thirty-two elements are different from the two hundred and ten features from which they were created.

In contrast the principal component selection 422 helps find the best subset of principal components that result in the highest accuracy for a classifier (described below). An alternative description of the principal component selection 322 function of the principal component selector 322 is that it ranks the principal components, one by one in terms of statistical test value, without changing them. By conducting the principal component selection, the final set of patterns and classifier rules is likely to avoid over fitting because of less redundant principal components that minimize the noise effects on the classifier's performance, which means accuracy, and that also shortens computational time for the classifier to come up with the accuracy for pattern matching. Thus, there is no change in space in the items under manipulation. The result of the principal component selection step is also principal components.

The more information added to the classification patterns and rules (sometimes referred to in combination as the classification model), the better classification the patterns and rules can achieve. However, according to a so-called curse of dimensionality, recognized by some researchers, at the same time, more or too much information could worsen the predictive power of the patterns and rules. Thus, it is important to identify some definitely useful principal components via principal component selection. Thus, the principal component selection step is quite important to make a noise-robust model, enhancing generalization and reducing the chances of over-fitting, along with dimensionality reduction techniques.

In detail, there are three methods that are widely used for the general concept of feature selection, which in this case is a principal component selection. These three methods are: the filter, wrapper, and embedded methods. These will be discussed below. In a preferred embodiment of an invention hereof, a wrapper method of principal component selection is used. However, others may also be appropriate, depending on the particular circumstances of the sound information.

The principal component selector 322 is coupled to a classifier 324. The function of the classifier is to classify 424, which means, to assign one of the cutting tool condition labels, in this example one of the three labels normal, trembling, deteriorating, to each of the frames of the information set composed of principal components (and, more typically, with an information set of only fewer, selected principal components).

The general idea of a classifier, and of classification is well known in the use and development of systems that analyze and categorize information. For instance, optical character readers analyze pages of text, and identify which marks on the paper (after having been converted to digital form) represent the letter W, and which represent the letter N, and which represent a smudge on the page. Another classifier analyzes text in an email to determine which email is spam, and which is desirable. Another classifier reviews information that represents photographs, and identifies faces, and yet a more specialized version of such a classifier would identify whether a face so identified belongs to a certain person (Leonardo da Vinci) or not. Classifiers also operate to identify sounds that correspond to words in spoken language. Finally, classifiers can also be used to identify whether a particular set of information that represents a musical song is one that a subscriber to a system might prefer, due to similarities of the song to others that the user has already indicated s/he prefers, or dislikes. Classifiers can analyze sets of information and identify one or more classes into which the information fits.

In this case, the classifier under discussion now in the pattern identifying and generating aspect of an invention hereof, reviews the information for frames of time that have been labeled by a human operator as one or the other of the three cutting tool condition labels, for instance normal, and establishes which numerical patterns that make up the information in the sound information set of normally labeled frames are common, or otherwise indicative of the normal condition, but not of the other labeled conditions of trembling and deteriorating. The classifier does the same for the frames labeled trembling, identifying patterns that correspond to trembling, and also to deteriorating.

The same, or a related classifier is used in a pattern matching aspect of an invention, hereof, discussed in connection with FIG. 8 below, which analyzes sound related information captured in real time as a CNC machine tool is being used to form a part in an industrial setting such as a machining center. That classifier matches the information related to the sounds that it collects in real time. If the match is to a pattern that corresponds to a label of normal, then the system permits the CNC machine continue to operate. If the match is to a pattern that indicates a label of deteriorating, then the system initiates some action that would cause the CNC machine to stop operating. That aspect of an invention hereof is discussed below.

There are many different types of classifiers. In designing one system, eight different classifiers were tested and then two with the best results were selected. These different types are discussed below. In a practical system for industrial use, typically only one classifier would be selected, and then that classifier would be used in both the pattern generating and pattern matching aspects of the methods and apparatus embodiments of the inventions.

So, in one aspect of its function, a classifier can learn which of the tool condition labels, correspond in the collected sound information, to what sorts of patterns within a set of principal components of a mid-term frame of the information set. It does this by analyzing all of the frames that are characterized by one tool condition label, such as normal, and identifying common patterns within the numerical values of the selected principal components. It does the same thing for each label. It may also analyze these numerical values across labels, for instance noting some patterns that are shared by frames in two or more label categories, and also some patterns that are never shared, which would indicate unique assignment to one label but not to another. Then, the classifier sets up rules, typically a hierarchy of rules, which can be followed to apply to an information set, to analyze it, and then to determine which tool condition label, which class, applies to the analyzed information set.

For a simplistic example, the rules can be of the type, if all selected principal component numerical values are negative, then the tool condition label must be deteriorating, if not, go to the next rule. Another simplistic rule might be, if the numerical value for a particular one of the selected principal components is larger than the numerical value for a different particular selected principal component, then a specific subset of rules should be considered, if not, then that subset of rules need not be considered.

Figure 8:
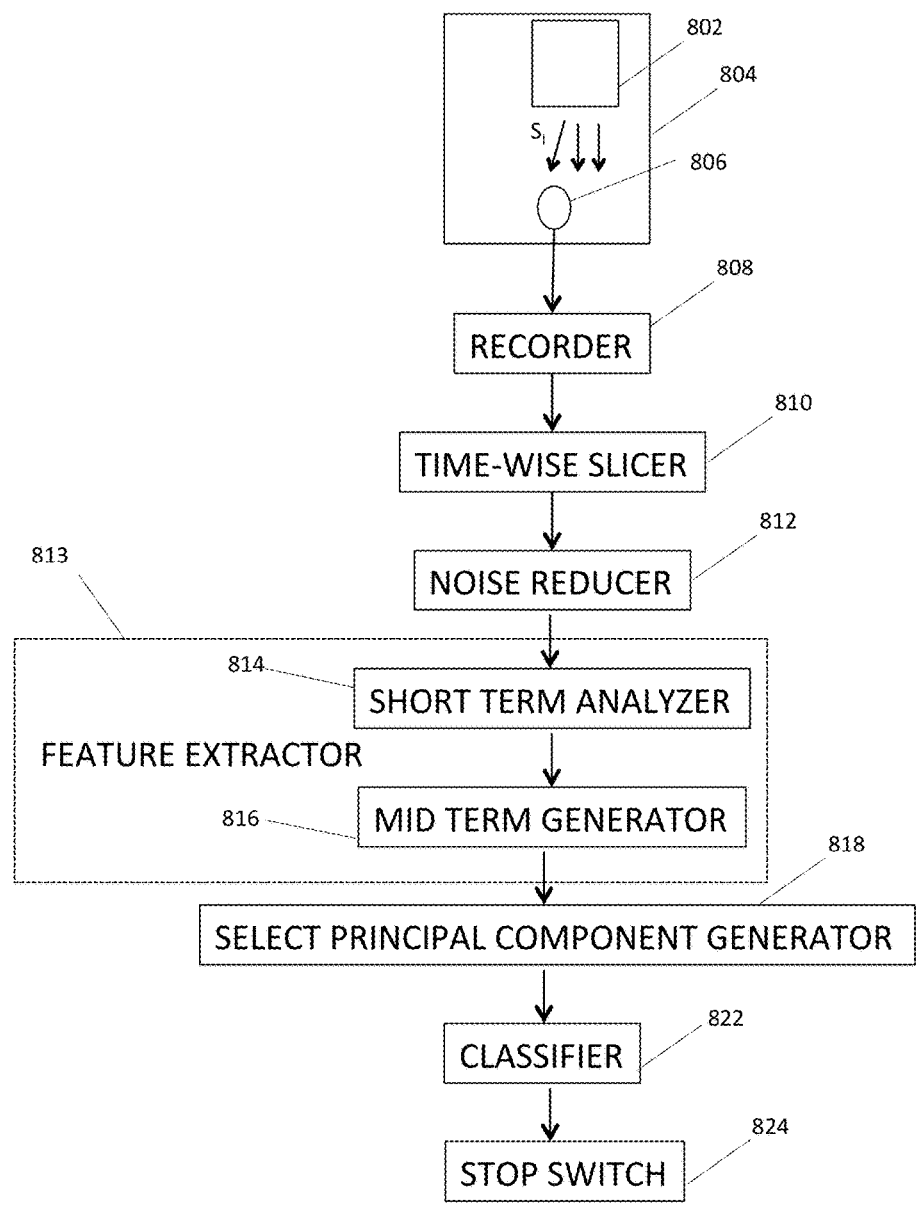
FIG. 8 is a schematic representation in block diagram form showing hardware equipment and signal and information analysis equipment of an invention hereof for using a reference information set and audio signals from an industrial CNC machine shop that can be used to anticipate or detect incipient CNC machine tool deterioration.
Figure 9:
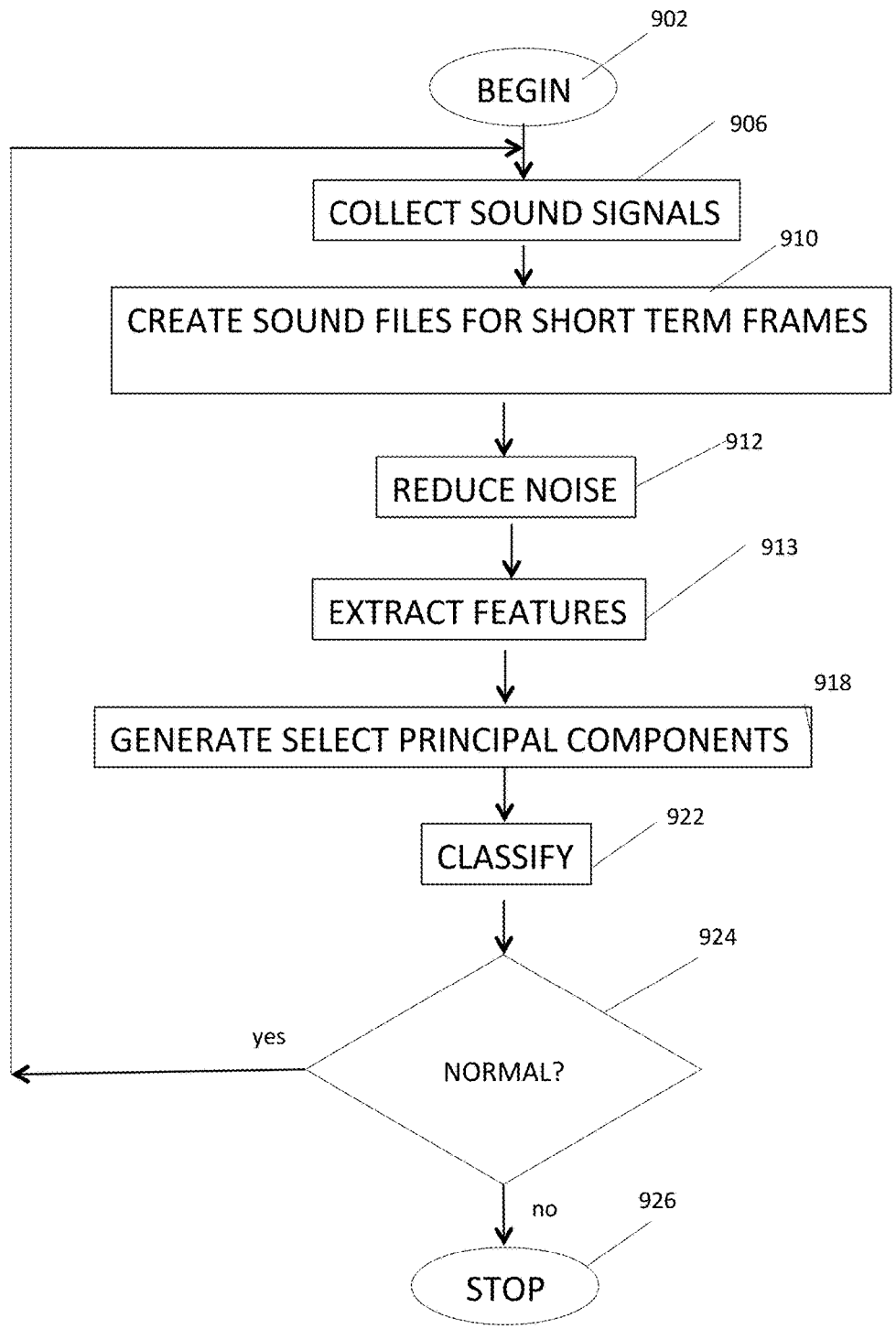
FIG. 9 is a schematic representation in flow chart form, of a method of an invention hereof for monitoring sound during use of a CNC machine in an industrial machine center, and using that sound to determine when to stop the machine before cutting tool damage occurs, which method steps can be performed by hardware shown in FIG. 8.

In subsequent use, for instance in the sound monitoring and pattern matching method invention shown schematically in FIG. 9, which may be performed by the apparatus shown in FIG. 8, the classifier 324 or classifiers that are identified as being most appropriate to identify the patterns in the sound related information that correspond to the labeled conditions is used to assign a label to frames of sound related information that is collected in real time during operation of a CNC machine that is cutting a work piece to make a part. Because the selected classifier or classifiers have been tested during the pattern generating method steps described, it is confidently able to identify sound patterns that are normal, and thus during which operation of the CNC machine can continue, as well as sound patterns that indicate trembling, which is a danger signal that requires at least special monitoring, perhaps stopping the machine, and also deteriorating, which related to sound related information patterns that are highly correlated to even more serious indications that tool failure would soon arise if the machine were not stopped.

Figure 10:
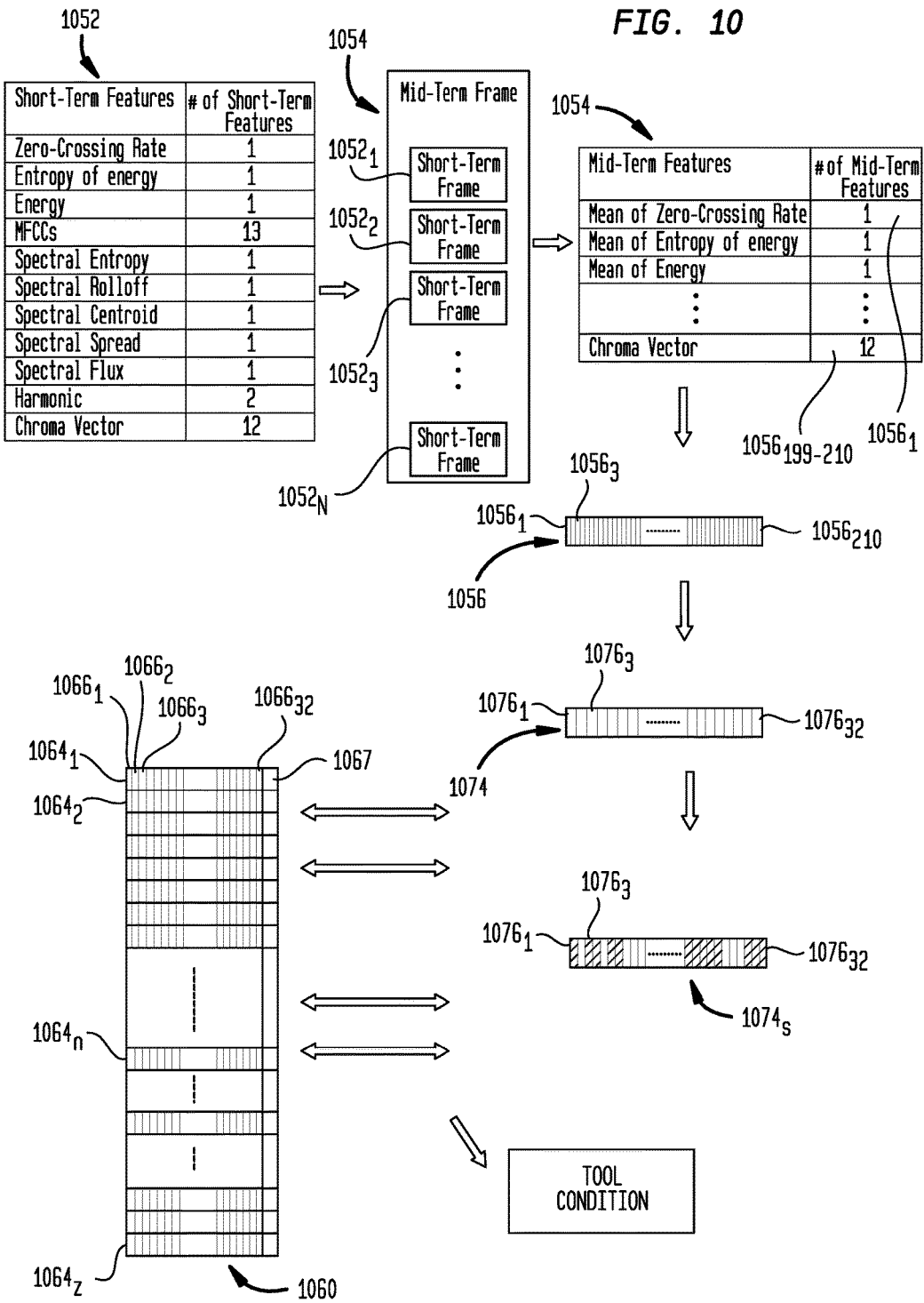
FIG. 10 is a schematic representation, in block diagram form, showing the signal transformations that take place while the method steps shown in FIG. 9 take place, showing a short term frame alone, a mid-term frame composed of several short term frames with mid-term features, a mid-term frame of principal components, and then selected principal components, and then comparison of same to a reference balanced information set of principal components.

After the classification step, resulting in a balanced principal component reference information set as at 1060, shown in FIG. 10, and rules for matching patterns of the values of the principal components thereof to the patterns in a related item of sound related information generated in an industrial machining center, the process for generating patterns of sound related information ends 425.

Many aspects of the method and apparatus inventions for identifying and generating an information set of patterns of numerical values that correlate to different CNC machine tool conditions have been discussed in general, and will be discussed in more detail below. Such topics include noise reduction, feature extraction, the short-term features and mid-term features, principal component analysis, principal component selection, and more. However, before discussing those aspects in detail, it will be helpful to discuss generally additional aspects of inventions hereof for use anticipating incipient tool failure and preventing such actual failure. Most of these elements of these inventions are similar to those discussed above. Thus, the next sections discuss, in general, and parallel fashion, apparatus and methods for monitoring sound during use of a CNC machine, and using that sound to match patterns in an information set created as described above, and with that pattern matching, determine when to stop the machine before tool damage occurs.

Pattern Matching—Methods and Apparatus

FIG. 8 is a schematic representation in block diagram form showing hardware equipment and signal and information analysis equipment of an invention hereof for using an industrial set of information and audio signals collected during fabrication of a part by a CNC machine in a machine shop, and comparing sound related information from that collected audio signals to a reference information set of sound related information that has been previously created. The comparison is based on classification rules that result in identifying a label that indicates cutting tool condition. FIG. 9 is a schematic representation in flow chart form, of a method of an invention hereof for collecting such audio industrial related information and using it to detect incipient tool deterioration and to anticipate cutting tool failure, and thus to stop operation of the machine tool in an industrial setting, before cutting tool failure happens.

Turning now to FIGS. 8 and 9, much of the following discussion and description is similar to that above in connection with generating a reference information set for use detecting tool failure, because to use the reference information set, similar industrial sound information generated in real time while using a CNC machine tool in an industrial setting to cut/create a part must be collected, analyzed, and manipulated in similar manner to the sound information that was used to generate the set of patterns discussed above. Furthermore, similar steps are taken to manipulate and organize the industrial information set.

A CNC machine tool, 802 is situated in a machine center 804, which typically contains other sources of audible noise. A general purpose microphone 806 is arranged so that it is able to collect (step 906, as shown in FIG. 9) audible sound signals $S_I$ that are generated in the industrial machine center 804 in the general vicinity of the CNC machine 802. Thus, as with the pattern generating process, the pattern matching process begins 902 with a sound signal collection step. The microphone 806 is coupled, electronically to a sound recording device 808 capable of recording and archiving and later replaying the sound signals captured by the microphone 806. It is desired to capture sound that is in the human audible frequency range. The sound can be recorded in the time domain, for a series of segments of time, as waveforms, in .wav file format, in the same manner as discussed above in connection with pattern generating aspects of inventions hereof.

The sound is collected 906 in a format and at intervals and sampling rate appropriate for the reference information set to which it will be compared. The system collects audio signals and then transforms them into audio related information essentially continuously, because a goal of the collection is to monitor all sounds that might indicate that the cutting tool is deteriorating or about to fail.

The waveform files are either sliced 910 (FIG. 9) into time-wise slices of uniform length by a slicing unit 810 (FIG. 8) (also referred to herein and in the figures as a time-wise slicer) or they are created in such time-slice units. A typical length of time for a single slice is 0.05 sec. The same scheme for composing short term frames of sound files from the slices, using a window of a specified short term duration, and a step, as discussed above is used.

The recording device need not associate a cutting tool condition category label with reach time frame, such as in the method and apparatus for identifying and generating patterns discussed above, because the sound information collected with this embodiment of an invention hereof is real-time, industrial setting, CNC machine operating sound information. Rather, eventually, the apparatus and method will compare signals derived from this collected sound information, and determine which label to apply to the frame of sound related information. Thus, in this aspect of inventions hereof, there is no step analogous to labeling step 411 discussed above, at this point, and human operators are not involved with labeling sound related information.

For clarity in the following discussion, if necessary, the audio information that was initially collected and used to create the reference information set is referred to as the reference audio information, and concepts connected with that are referred to as corresponding reference such concepts. The audio information collected in the commercial machining center, is referred to below as the industrial information, and concepts connected with the machine center setting are referred to as industrial concepts.

In general, the industrial sound information $S_I$ also contains noise, artifacts, and outliers, as discussed above, and this unwanted sound should be removed from the industrial sound information $S_I$ as part of its analysis and transformation. Noise can be reduced 912 with a noise reducer 812 in the same general manner as noise reduction was conducted above, preferably using a noise profile, still to be discussed in more detail below. Noise is unique to each use setting. Noise reduction is prepared for before using the pattern matching aspects of inventions hereof. An industrial setting noise profile is created before use, and the noise is removed from the subsequently recorded industrial audio sounds before those sounds are analyzed for short term features.

A feature extractor 813 is coupled to the noise reducer 812, and takes the noise reduced signal and extracts 913 useful sound related features from the noise reduced signal. In a high-level view of the step of extracting features 913, similar signal processing as was done to the reference sound related information to create the reference pattern information as discussed above sets is applied to the collected industrial signals. Each .wav file experiences two different processes, one called a short-term process, conducted by a short-term analyzer 814 and the other called a mid-term process, conducted by a mid-term generator 816. In practice, a CNC machine operator would provide to its users a sound information set that includes a classifier and a balanced reference principal component information set, as shown in FIG. 10 at 1060, and discussed below. That balanced information set would have been produced using noise reduction with a noise profile, as discussed above. But, the industrial machine center user would also need to apply its own noise reduction and would need to create a noise reduced audio information file using it's own noise profile, custom prepared accounting for the local noise environment of its own CNC machine.

During the short-term process, each .wav file is sliced in the time-wise slicer 810 into the same size and composition frames as was done for the reference information set used to identify and generate patterns, in the example discussed above with a frame size duration of 0.05 sec. and a step of 0.025 sec.

The short-term features are extracted from each frame in a short-term feature analyzer 814. The short term features are described in detail below and in connection with FIG. 5, but they are as discussed above, and in a useful embodiment, thirty-five different short-term features are identified and measured. Thus, for each short-term frame of time, an output of the short-term analyzer 814 is a signal that has thirty-five elements, one each of each of the thirty-five short-term features.

After extracting the short-term features, mid-term features as discussed above, are generated in a mid-term feature generator 816, by taking statistical attributes of some or all of the thirty-five short term features for a mid-term frame. A typical mid-term frame duration size can be 2.0 sec., and can have a step of 1.00 sec. These statistical attributes are as discussed above. Thus, as with the pattern identifying and generating aspects of inventions hereof, because for each mid-term frame, six statistical operations are conducted on thirty-five short-term features, a total of 6 times 35=210 (two hundred and ten) mid-term features can be generated according to this embodiment.

There is an important distinction between the pattern and rule generating aspects of inventions hereof, discussed above, and generation of a reference information set. For the reference situation, an information set composed of many, many vectors of information, each related to a mid-term duration of sound is created. For instance, a reference feature information set can be composed of several hundred mid-term sound related vectors. For the pattern matching aspects of inventions hereof, a large information set like that is not created. The reference feature information set 558 discussed above and already created during the pattern generating aspects of inventions hereof is used (or, more exactly, a reference principal component information set 660 (FIG. 6 and a balanced reference principal component information set 1060, discussed below, shown in FIG. 10) is used), but a new industrial information item is created. The industrial information of interest is best thought of as a stream of mid-term related vectors, each vector representing a mid-term duration of sound generated in the industrial setting. Each mid-term vector is transformed, and analyzed, one vector after another as material shaping in the machining center takes place over time. The system bases its action outputs on a comparison of each individual mid-term vector of information to patterns of a balanced reference principal component information set 1060, governed by the classifier rules of comparison and analysis.

Thus, an output of the mid-term feature generator 816 is for each frame of mid-term duration, a vector 1056 (FIG. 10) that has two-hundred and ten elements. Thus, it can be thought about in the same manner as discussed above as a stream of vectors, one vector for each mid-term unit of time, which has two hundred and ten elements, one element for each mid-term feature.

Because, as discussed above, analysis of a signal that has so many elements for each relevant time unit has drawbacks and is not optimal, it is important to reduce information dimensions by applying 918 (FIG. 9) some dimensionality reduction technique. Since the method of dimensionality reduction of principal component analysis was used in the example to create the reference pattern principal component information set 660, the same principal components should be generated using the same rules for principal component generation in a principal component generator to analyze the real-time generated industrial sound related information. Thus, the feature extractor 813 via the mid-term generator 816 can be coupled to a principal component generator 818 (FIG. 8).

Thus, the mid-term feature information is provided to a principal component generator 818, which generates as its output a stream of industrial information vectors 1074 (FIG. 10), each of which has fewer dimensions than the two hundred and ten of the mid-term features. In the example under discussion, a thirty-two principal component industrial information vector 1074 provides very good results. This will be discussed in detail below.

In fact, as discussed above, certain classifiers work best with fewer than all of the available principal components. Thus, depending on which classifier is being used, it is very likely that it is not necessary to generate all of the possible principal components in the industrial setting. Rather, only the selected principal components need to be generated. Thus, in pattern matching aspects of inventions hereof, a select principal component generator 818 only needs to generate the selected principal components 918, to constitute for each mid-term duration of time, a select principal component industrial information vector 1074$_s$, in which only the selected principal components, shown as cross hatched, need to be computed and compared to the balanced principal component reference information set 1060. This too is discussed in detail below.

The pattern matching, real-time analysis of cutting sound related information does not include an information balancing step analogous to that shown at FIG. 4, 420, or an information balancer such as shown at 320, FIG. 3, because this industrially collected information is not being used to identify patterns and determine which categories of tool wear the patterns relate to. That has already been done. Thus, the industrially collected information need not be forcefully balanced.

The select principal component generator 818 is coupled to a classifier 822. The function of the classifier is to classify 922, to assign one of the labels, in this example one of the three labels of normal, trembling, and deteriorating, to each frame of sound related industrial information as it is generated by the select principal component generator 818. The classifier 822 works in a related but somewhat opposite fashion from the classifier 324 discussed above. The classifier 324 discussed above, in general, took all of the frames of information that had been labeled trembling, for instance, and compared each to each other, and performed additional steps, and established general rules to describe patterns that all correspond to a frame labeled trembling. This has been described. The end result is a reference information set of patterns that are categorized as trembling patterns. There can also, or instead of a reference information set of just the patterns, be a set of rules, arranged in some sort of hierarchy of operation, that is traversed, to determine which label to assign to a specific pattern of feature values. The classifier 822 works in an opposite way, but using the same patterns and rules, or correlative rules. It compares the pattern of select principal component values for each frame of sound information generated during real time industrial operation of a CNC machine, to the reference information set of patterns, and determines what tool condition label should be assigned to the industrial frame of values. Or, rather than comparing to patterns, the classifier can apply the hierarchy of rules established by the classifier 822, whichever is appropriate, or both.

Classifiers as used herein are not new, and work according to known principals, which need not be discussed in further detail herein.

The classifier 822 matches (classifies 922) the information signals related to the industrially collected sounds that the system hears in real time. A comparison is made 924, to determine if the information signals derived from the industrially collected sounds match any of the information in the reference set.

The classifier makes the comparisons and determines if there is a match with conventional classifier methods. For each time duration of mid-term duration, an industrial information vector 1074$_s$ from the industrially collected sounds will consist of numerical values only for each of the selected principal components. The classifier will have a set of rules, as discussed above, consisting of different conditions for one or more of the selected principal components' numerical values, matching those conditions to tool condition labels.

If the match is to a pattern that indicates a label of normal cutting tool condition, then the system returns a yes at decision step 924 and lets the CNC machine continue to operate and returns to step 906 collecting sound signals. If the match is to a pattern that indicates a cutting tool condition label of trembling, or deteriorating, then the system returns a no (for not normal) at decision step 924 and initiates some action that would cause the CNC machine to stop operating, and the method stops 926.

The foregoing has described, in general, CNC machine pattern generating and matching apparatus and method inventions, which relate to audible sounds that characterize the wear-related condition of CNC machine shaping tools. Such a reference information set of patterns can be created for a specific CNC machine and tool and general work piece. The foregoing has thus also described using such a reference information set of audible sound related patterns at a specific CNC machine, collecting audible sound signals in real time at an industrial use CNC machine, identifying any patterns embodied in the industrial audio signals, and matching those patterns to patterns in the reference information set generated as described above, to detect incipient tool deterioration and failure, and lead to stopping the CNC machine before any catastrophic failure. The following describes some of the concepts discussed above, in more detail, including noise reduction, feature extraction, the short term and mid-term features, principal component analysis, principal component selection, types of classifiers, and signal types and signal flow.

Detailed Discussion of Specific Concepts

To reduce the impact of noise/artifacts, information pre-processing work (i.e., noise filtering) is done with the .wav files. For example, with a common sort of milling machine, one of the prominent non-cutting noises comes from air and oil mist nozzles, which inject air and oil mist onto the work piece being prepared to be cut. Such non-cutting sounds should be sufficiently removed from the .wav files to improve the prediction performance of the reference information set, because the air and oil mist sounds masks the sounds of the tool cutting. Noise profiling can be used and is preferred for many cases because it is very effective.

As the first step for noise profiling, the underlying noise profile is captured from the noise-only information, and the noise profile is applied to the entire sound information set to filter out based on the profile. The noise-only information is generated from audible sound files recorded at a time when the CNC machine is not cutting, when the only audible sounds arise from non-cutting noise.

The noise profile is statistical information of a particular noise, which can be captured from a noise-only sound information file. The statistical information for a useful method can include sample type, FFT (fast Fourier transform) size, and three sets of FFT coefficients, such as the lowest amount of noise found, the highest amount, and the power average. One example would show the highest amplitude of detected noise at each frequency, the lowest amplitude, and the amplitude below which noise reduction occurs. In tailoring the noise reduction, it is possible to trace a line that traverses, for each frequency, how much noise would be reduced in a certain frequency range. Within the information processing system, it is possible to move that line, for instance upward in a certain frequency range, to apply noise reduction in that newly selected frequency range.

For instance, in a situation where it is known from other measurements that the sound of the tool cutting is primarily spread across the frequency range between 1 kHz and 4 kHz, and from the noise-only signal, that the noise and artifacts are spread in the ranges below 1 kHz and above 4 kHz, the noise profile line can be set lower in the frequency range between 1 kHz and 4 kHz than in other ranges. This will then suppress the noise and artifacts, but will not affect the cutting sound signal. Also, this setting in the noise profile can keep the cutting sound information undistorted after it is applied to the noise reduction process.

The amplitude reduction of detected noise/artifacts, and the percentage of noise reduction in the output signal (by which it is meant the noise reduced industrial machine center signal) should be tuned accurately. Otherwise noise reduction can cause an out-of-phase sound In other words, it is likely to have a boxy sound because noise reduction reduces the sound signal too much, which sound signal contains both the cutting sound and noise/artifacts sound. Thus, to maximize noise reduction while minimizing the impact of artifacts and original sound distortion, the value of amplitude reduction can be beneficially set to 10 dB, which is quite a low level, and the percentage of noise reduction in the output signal can be set to 50%. The practitioner can use these amounts as guides, about which to vary the noise reduction parameters for the particular situation at hand. In practice, this can be confirmed by listening to the recording of the machine cutting and the normally accompanying noise, and then also listening to the recording of the noise alone. The noise profile can be created as described, and then subtracted from the recording of the cutting and accompanying noise, and then can be listened to. If the resulting adjusted sound is boxy, or sounds like there are attendant echoes, as would sound in a hard, non-damping room, then it is likely that amplitude reduction and percentage of noise reduction is not properly tuned, and should be returned.

Elaborating further, as used herein, amplitude reduction means the level of noise reduction. In general, values between 6 and 30 dB work well. Also, it's related to setting the level of reduction for audio below the noise floor. With higher values (especially above 20 dB) dramatic reduction can be achieved, but the remaining audio might become distorted. With lower values, not as much noise is removed, and the original audio signal stays relatively undisturbed. The percentage of noise reduction means the percentage of frequencies processed when audio falls below the noise floor. Fine-tuning this percentage allows greater noise reduction with fewer artifacts. Values of 40% to 75% have worked well in examples discussed herein. In summary, it has been found that with the examples considered herein, it is not practical to remove all of the noise, because there is an overlap between characteristics of the noise and characteristics of material shaping. If all of the noise were to be removed, some of the shaping sound would be removed also. Thus, some iteration and judgment must be used, along the lines discussed above.

Such a system has been successfully used, in which regular cutting sound signals are not changed by filtering. This was confirmed by observing by listening/hearing and by visually inspecting a spectral diagram as well. Because a goal of inventions hereof is to take advantage of the audible sounds that a skilled operator can use to discern between different conditions of tool wear, by using a machine oriented system to monitor the audible sounds, it is important to gauge sound signal integrity by human hearing, because any sound signal is prone to be distorted when it passes through a filter. Human observation by listening has confirmed that a noise profile filter as described above works quite well. Such a noise reduction filter 312 is applied 412 to reduce noise to all the sound information, including normal, deteriorating, and trembling, and is used to identify and generate patterns of sound related information that are labeled as such.

Feature Extraction

As discussed above, short-term features are extracted from the sound related signals, and then statistical operations are applied to them to generate mid-term features. A suitable set of short term features are discussed in detail below. They include both time-domain and frequency-domain concepts. Thirty-five are discussed here. More, including additional, different concepts, or fewer, including only some of these, or some of these along with different concepts, are also possible. A suitable collection of short term features are set forth in Table 1, below.

The zero-crossing rate is the rate of sign-changes of the sound information divided by the duration of the sound information, and it can be a measure of the noisiness of the sound information.

Entropy of energy can be a measure of sudden changes in the energy level of sound information. Sudden tool breakage or even deterioration may be accompanied by significant change in the energy level of sound.

Energy is calculated by a sum of magnitude of the squared discrete FFT (fast fourier transform amplitude) component and then normalized by the window length.

Mel-Frequency Cepstral Coefficients (MFCCs) represent the short-term power spectrum of a sound, based on a linear cosine transform of a log power spectrum on a nonlinear mel scale of frequency. In practice, MFCCs have been widely used in the field of sound analysis, including speech recognition. For feature extraction, there are thirteen features associated with MFCCs. It has been found that using the first thirteen MFCCs (as produced in a conventional manner) provides useful results. Thus, MFCCs constitute thirteen of the thirty-five features in the example under discussion here.

Spectral entropy can be computed in a similar way to the entropy of energy, but on the frequency domain. Also, it is the same as the Shannon entropy of the spectral density.

Spectral roll-off is the $N_{th}$ percentile of the power spectral distribution, where N is usually 85% or 95%.

Spectral centroid stands for the so-called center of mass of the spectrum, and it is generally associated with brightness of a sound. Each centroid of a spectral frame is defined as the average frequency weighted by amplitudes, divided by the sum of the amplitudes.

Spectral spread is the square root of the second moment about the mean, which refers to the spectral centroid.

Spectral flux is a measure of the amount of local spectral change between two successive frames, and it is computed as the squared difference between the normalized magnitude of the Fourier transform at successive frames.

Harmonic pitch class profiles (HPCP) is a vector of features extracted from an audio signal, based on the pitch class profile descriptor proposed by Fujishima in the context of a chord recognition system (Lee, 2006). It is essentially a smoothed chroma feature (Sturm, 2010). There are two features for harmonic, which are pitch and fundamental frequency. Thus, HPCP constitutes two of the thirty-five features in the example under discussion here.

Chroma vector consists of a twelve element vector, with each dimension representing the intensity associated with a particular semitone, and can also be used in place of MFCC means (Ellis, 2007). (It is important to note that MFCC means differs from MFCC, mentioned above.) A temporal sequence of chromas results in a time-frequency representation of the signal known as a chromagram (Bello & Pickens, 2005). There are 12 features that constitute chroma vector. Thus, chroma accounts for twelve of the thirty-five features in the example under discussion here.

The Table 1 below summarizes the thirty-five short-term features of the example under discussion here.

TABLE 1

SHORT-TERM FEATURES

| Short-Term Features | # of Short-Term Features |
|---|---|
| Zero-Crossing Rate | 1 |
| Entropy of energy | 1 |
| Energy | 1 |
| MFCCs | 13 |
| Spectral Entropy | 1 |
| Spectral Rolloff | 1 |
| Spectral Centroid | 1 |
| Spectral Spread | 1 |
| Spectral Flux | 1 |

TABLE 1-continued

SHORT-TERM FEATURES

| Short-Term Features | # of Short-Term Features |
|---|---|
| Harmonic | 2 |
| Chroma Vector | 12 |
| TOTAL | 35 |

Figure 5:
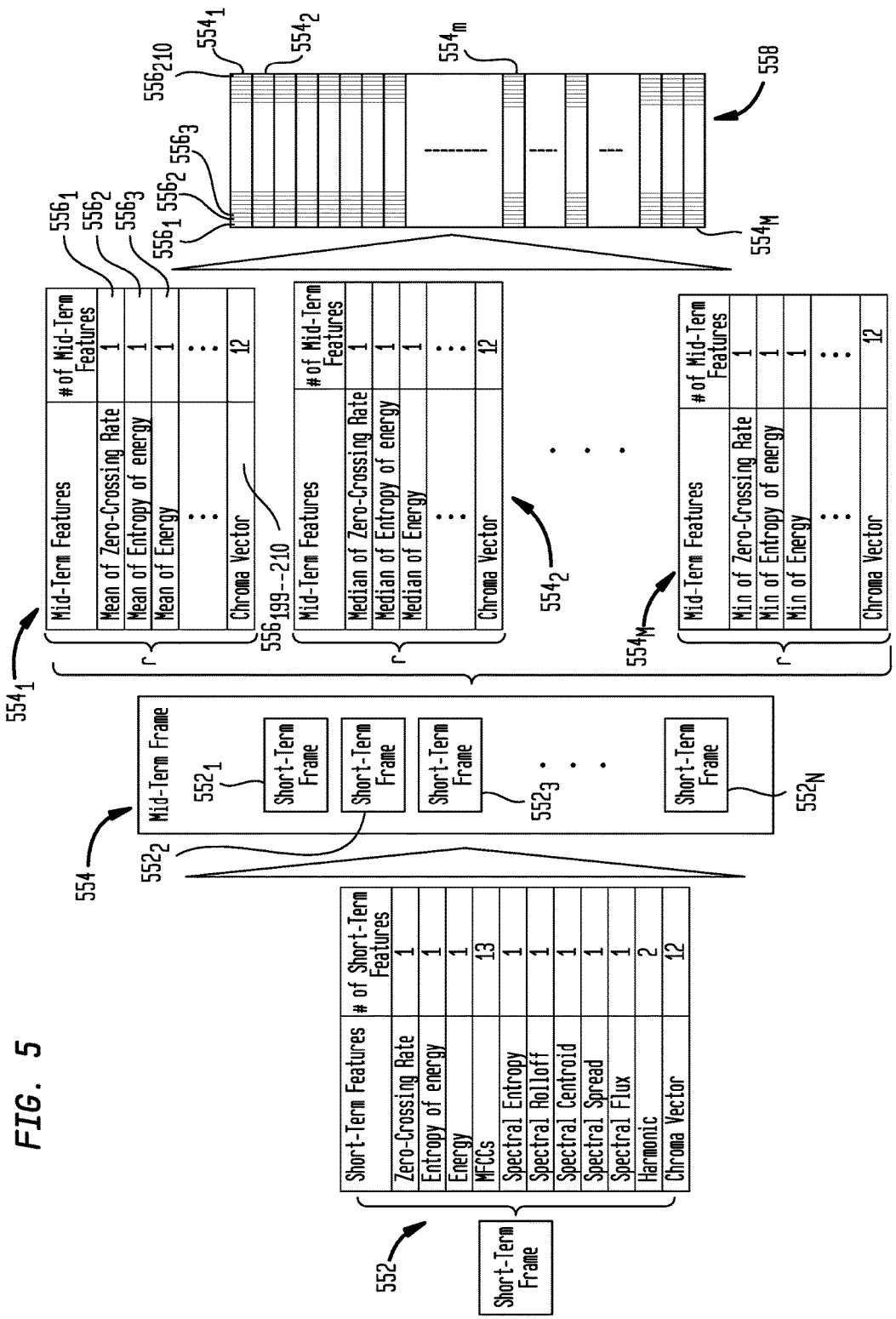
FIG. 5 is a schematic representation, in block diagram form, showing the signal transformations that take place while the method steps shown in FIG. 4 take place, including the generation of short time frames, association of same into mid-term frames and extraction of mid term features for a plurality of mid-term frame.

FIG. 5 shows schematically in block diagram form some aspects of the signal processing that takes place to make use of the recorded audio signals. As discussed above, a short-term frame 552 is established for a short duration of the audio signal, for instance for 0.05 s. From this short term frame, thirty five short term features are determined, as listed in the block 552. A stream of short term frames $552_1$, $552_2$, $552_3$, $552_n$, ... $552_N$, is created, each for the short term duration, and typically each overlapping a previous frame for a certain duration, for instance 0.024 s. The short term frames $552_1$ through $552_N$, which arise over the duration of a mid-term frame $554_m$, for instance 2.0 seconds, make up the components of a mid-term frame $554_m$. The number, N, of the short-term frames, depends on the duration of each short term frame, the step size, and the duration of the mid-term frame.

Each mid-term frame $554_1$, $554_2$, $554_m$ ... $554_M$, is composed of the q different, in this example, six, statistical treatments to the elements of the short term frames $552_1$ through $552_N$, which arise over the duration of a mid-term frame. Such statistical treatments may include: mean of zero-crossing rate, mean of entropy of energy, and, for each of twelve chroma elements, their mean. Each mid-term frame also is composed of the other five statistical treatments of the same elements of the short term frames, for example also median of these elements, as well as the others mentioned above. (Chroma features are powerful representations, typically used for music audio, in which the entire spectrum is projected onto 12 bins representing the 12 distinct chroma of the music octave. Thus, each chroma vector typically has 12 elements and each element represents the energy corresponding to one pitch class in the spectrum. And thus, for Chroma (all twelve of them) there would be seventy-two in number for the number of mid-term features.

As discussed above, typical statistics, can be, such as, in this example, mean, median, standard deviation, standard deviation by mean value ratio, maximum, and minimum, for all of the short term frames that make up each mid-term frame. In this example, there are p=35 short-term features and q=6 statistics for the mid-term. Thus, for each mid-term frame $554_m$, there are r=p×q=35×6=210 mid-term features: $556_1$, $556_2$, ... $556_r$, ... $556_{210}$.

Figure 6:
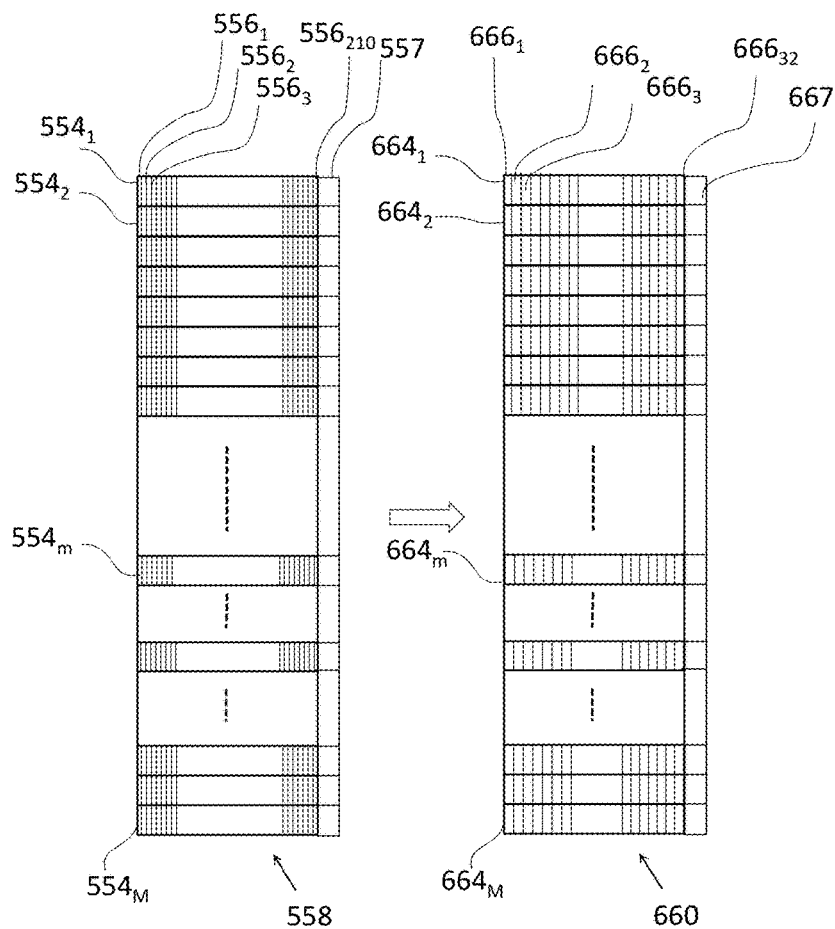
FIG. 6 is a schematic representation in block diagram form showing a reference information set of vectors of mid-term features, and a transformed reference information set of vectors of principal components.

As shown schematically with reference to FIG. 6, for each unit of time t for a mid-term duration, the reference sound information set 558 has a set of mid-term features $554_m$, which has r (in this example, two hundred and ten) elements, each element constituting, or characterized by a numerical coefficient. A label 557, which corresponds to the cutting tool condition, is also associated with each mid-term frame $554_m$. This mid-term frame can be thought of as a vector, having r (in this example two hundred and ten) plus one=two hundred and eleven dimensions $556_1$, $556_2$, ... $556_{d+1}$, ... $556_{210}$, 557. Thus, each mid-term frame $554_m$, could be thought of as constituting a row in a matrix. The row has two hundred and eleven elements.

As shown schematically with reference to FIG. 6, a reference sound information set is composed from sound information collected during a duration of cutting time that results in a number M of mid-term time frames. Such a reference sound information set, made up of all M of the mid-term frames 554 for a given duration of cutting time, can be thought of as a matrix that has a row for each mid-term duration frame $554_1$, $554_2$, . . . $554_M$, with two hundred and eleven columns, each column for one of the two hundred and ten elements that make up the mid-term frames, discussed above and one for the condition label. Thus, a reference feature information set 558, can be equivalently be thought of as a set of vectors, each vector corresponding to a row of such a matrix. Each vector has (in this example) two hundred and ten elements, or dimensions plus one for the label, for a total of two hundred and eleven elements for the vector row. The number of vectors in a reference sound information set 558 depends on the duration of the cutting time used to generate all of the reference sounds. There is one vector for each mid-term frame duration of time.

The reference feature information set 558, as shown in FIG. 5 is used for the method aspect of the invention to generate patterns in the coefficients of the features that relate to the audio sound information. Yet another, much smaller, yet related industrial information item, which can be thought of as a vector, such as shown schematically in FIG. 10 at 1056, having two hundred and ten elements (and related, transformed principal component vector 1074 and select principal component vector $1074_s$, each having fewer than two hundred and ten elements) is created in real-time from the sound of a CNC tool cutting in an industrial setting. Aspects of the industrial information vector 1056 could be compared to aspects of the reference feature information set 558 and patterns in elements of the real-time industrial information vector 1056 could be matched to patterns of elements of the reference feature information set 558, to determine the category of cutting tool wear condition of the cutting tool at that moment, as it is being used. However, the reference feature information set 558 is very large—with two hundred and ten elements plus an additional tool condition label for each time segment of a mid-term duration. As discussed in outline above, it is possible to reduce the number, or dimension of these elements, by generating principal components, which then facilitates comparison between a modified version (1074) of the industrial information vector and a modified reference information set 660, of principal components, or a further modified version $1074_s$ of the industrial information vector of even fewer, selected principal components, to make tool condition determinations. As an aspect of those reduction techniques, a related principal component reference information set 660, shown in FIG. 6, is used in connection with a method aspect of an invention hereof to generate and then match patterns related to audio signals created in real-time use of a CNC machine. The following details that discussion further.

The reference feature information set 558 can be enhanced to facilitate its use in generating patterns for matching. It is treated as a matrix having a number of columns r, as discussed above, which initially equals in this case two hundred and ten. The number of rows can vary. Each row corresponds to a duration of time attributable to a mid-length term. This reference feature information set can be used to train and evaluate the accuracy of the system. Thus, it is useful to divide it into three portions: training, validation and testing. As an example, the training and validation portions can use 40% each of the information, and the testing portion can use 20%. The percentages are of the total number of rows, or, the total duration of the time. Thus, 40% of the information taken over time will be used for training, 20% for testing, etc. (By a % of time, it is mean a percentage of the total duration of time, in terms of mid-term periods. Each mid term period is represented by a row of the reference feature information set matrix. Thus, the percentages are also fulfilled by with reference to the total number of rows of the matrix of the reference information set.)

This can be done by any acceptable information selection method, for instance, assigning a random number between 0 and 1 to each row, and then in some fashion dividing the rows among the portions in the correct proportions based on the random numbers assigned. This process results in providing two additional elements for each row—one for the random number and one for the use portion. Finally, each row, which it will be recalled corresponds to a mid-term frame in time, will also be provided with a label that corresponds to the tool wear condition assigned to that moment in time by the experienced human operator, such as in this example, normal, trembling and deteriorating.

A typical set of reference information for the pattern generating aspects of inventions hereof might have on the order of 5,000 to 10,000 rows/vectors, which would be split up according to percentages as above.

What follows is a more detailed discussion of the above mention of reducing the number of items that must be considered from the over two hundred mid-term features. This is styled in this work as generation of principal components. In the field of information processing, such a technique may be referred to as reducing the dimensions of the problem. Consideration of the reference feature information set 558 reveals that it has a relatively large number of attributes (columns, if considered as a matrix also as mid-term features if considered as a set of sound related information). If an information set were created from the reference sound information set that had fewer attributes, but which retained a significant amount of the essential information, it would be easier and more efficient to work with that smaller information set. Multivariate and correlation analysis of the information within the reference feature information set 558, for instance with the estimation method of pairwise, reveals that in a typical example, the reference feature information set has many highly correlated features, or elements within each vector.

For instance, a scatterplot matrix gives a clear view that many mid-term features are highly correlated with each other. Relatively narrow ellipses in a scatterplot show the degree of correlation between many pairs of features. With a scatterplot, if the ellipse comparing any two features is round, that means that the two features are not correlated, but if the ellipse is narrow, the two features are correlated. Analysis of information sets produced as discussed above show highly correlated features in a scatterplot matrix of the reference feature information set 558. As a simplistic, non-realistic example, for instance, it may be that the scatter plot analysis shows that the median of zero crossing rate correlates very closely with the median of energy. This means that if one of the two varies from time to time, the other also varies in the same manner, in such a way that very little, if any additional information would be obtained from monitoring and analyzing both of these features, as compared to monitoring and analyzing either one or the other alone.

Thus, dimensionality reduction is desirable. There are various suitable means, which fall into two different general kinds of approaches, called linear and nonlinear. Linear methods assume that feature vectors are located close to a lower dimensional linear subspace (the principal component subspace) and that the feature vectors are projected onto that subspace (Cunningham & Ghahramani, 2015). Methods using linear dimensionality reduction conduct a matrix factorization of the feature vectors and generate latent aspects, which stand for principal components in principal components analysis (PCA) (Rai, 2011). Among the linear methods, PCA and factor analysis (FA) are widely used (Fodor, 2002). However, generally, PCA deals with all the observed variance, while FA attends primarily to shared variances. There is no need to determine intrinsic factors with respect to the inventions of interest here. Thus, FA is not considered of great interest for inventions disclosed herein.

Nonlinear methods are generally used for feature vectors that contain a nonlinear manifold (Rai, 2011). A nonlinear manifold refers to a structure of low-dimensional surface embedded nonlinearly in high-dimensional space so it needs to recover the low-dimensional surface.

Thus, nonlinear methods can be effectively applied to the field of artificial intelligence, including image recognition through robot eyes and dynamic systems, such as climate information analytics. Among the nonlinear methods, kernel principal component analysis (nonlinear principal component analysis), locally linear embedding, isomap, maximum variance unfolding, and laplacian eigenmaps are known nonlinear manifold learning algorithms (Rai, 2011) (Roweis & Saul, 2000). For the inventions disclosed herein, the robust PCA method is used because it is widely-used for its certain functionality in noise reduction, ellipse fitting, and solutions for not-of-full-rank eigenvalue problems. Also, the robust PCA has been widely used in research areas, such as image segmentation, surveillance video processing. Its application with audio information classification is relatively recent and it has become a promising approach for singing voice separation in audio information. Along with those benefits related to robust PCA, the nonlinear dimensionality techniques, such as isomap, are preferable to use for the problems that include a relatively high signal-to-noise ratio, but the sound signals from the CNC machining center are typically received with a very low signal-to-noise ratio. Therefore, one of the linear methods, robust PCA, has been chosen for dimensionality reduction instead of the nonlinear dimensionality reduction techniques. However, it very likely could be that for certain specific applications for identifying tool wear in CNC machine operation, a nonlinear dimensionality reduction technique might be appropriate. Thus, although preferred embodiments of inventions hereof use a linear dimensionality reduction technique, it is not considered to be essential that the reduction technique be linear.

For inventions herein robust principal component analysis (PCA) is used. Use of PCA allows classification more effectively on a reduced dimensional space. Also, it can help cope with any possible issue related to relatively high correlation between particular mid-term features.

To conduct a robust PCA, the pairwise estimation (Aelst, Vandervieren, & Willems, 2010) method is used. Pairwise estimation produces a new hyperplane that takes an X-axis as the first component, which represents the direction of the greatest variability, and a Y-axis as the second component, which stands for the direction of the second greatest variability. Each principal component axis is a linear combination of all two hundred and ten features in the reference feature information set 558.

An eigenvalue table for the information set evaluation can be created. Inspection of the eigenvalue for each principal component, reveals that, for this example, thirty-two principal components account for greater than 80% of the total variation in the original feature information set 558, because the eigenvalue for each of the thirty-two components is greater than 1, which is a commonly used cutoff point (Fernandez).

A screen plot of the same information set shows a similar result, that the eigenvalue line is stable after thirty-two principal components. By using those thirty-two principal components, much of the variation among the mid-term features can be captured. In other words, by using the specially constructed principal component feature set, each of which mid term slice of time is represented by a vector having only thirty-two components, rather than one having two hundred and ten components, almost all (80% in this example) of the variation in information of the larger set is retained. Thus, only thirty two components need to be considered for every mid-term slice of time, rather than two hundred and ten. Each principal component is merely a number. Of course, because each such principal component number is generated by evaluating a linear expression that has one coefficient for each of the two-hundred and ten mid-term features (so, two hundred and ten coefficients), there is some computation that must be had. But, after that computation is completed, use of the resulting fewer principal components, is more efficient Thus, a new reference principal component information set 660 can be created, which has a row/vector that corresponds to each mid-term frame in time. However, rather than having a relatively large number, in this example, two hundred and ten, columns, one for each mid-term feature, the new principal component information set 660 has, in this example, thirty-two columns, one for each newly generated principal component. Each row of the principal component reference information set 660 has assigned to it a tool wear condition label (represented by column identified as 667), which is the same label as was part of the corresponding row for the mid-term feature information set 558 from which the particular mid-term principal component row was create (represented there by column 557). This principal component reference information set 660 is then balanced (discussed below) and the balanced version is used by the classifier 324 (FIG. 3) in the classification step 424 (FIG. 4).

Figure 7:
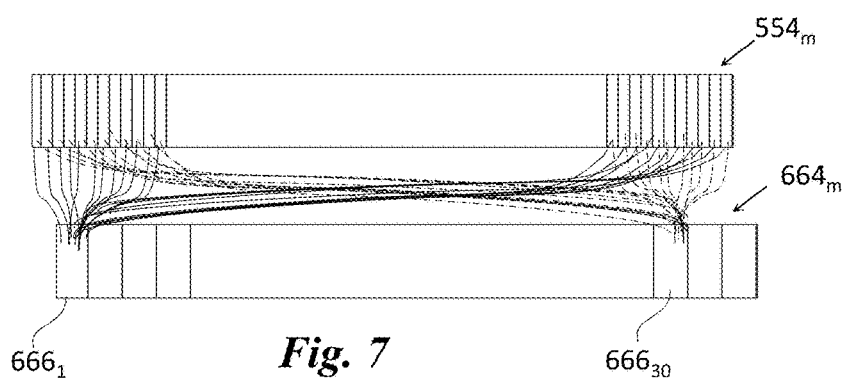
FIG. 7 is a schematic representation of how all of the many mid-term features contribute to the formation of each of the fewer principal components.

The foregoing has merely touched on how each principal component, $pc_1$, $pc_2$, $pc_i$ . . . $pc_{32}$, is constituted. Each principal component $pc_1$ is created using a linear combination of all of the mid term features in the feature information set 558, for the corresponding mid-term duration of time, as shown schematically with reference to FIG. 7. FIG. 7 shows schematically the portion $554_m$ of each reference information set 558 (features) and the portion $664_m$ of the set 660 of principal components that arose from a single mid-term frame of duration. Thus, each can be thought of as a row in a matrix that represents the respective information set. The row $554_m$ of the information set that represents the mid-term features 558 has two hundred and ten elements (columns) and the row $664_m$ of the reference information set that represents the principal components 660 has thirty two elements (columns). Each of two hundred and ten elements $556_1$-$556_{210}$ in a row $554_m$ of the feature information set 558 contributes to each element $666_1$-$666_{32}$ in the principal component information set 660. This is illustrated with respect to two elements in the principal component information set—the first, $666_1$ and the $30^{th}$—$666_{30}$ The contribution of each element from the feature information set 558 is governed by a relatively complex formula, which has two hundred and ten coefficients. An example of one such formula for a representative principal component $666_n$ is set out below. The value for $666_n$ equals the sum of $556_1*c_1 + 556_2*c_2 + 556_3*c_3 + \ldots 556_i*c_i + \ldots 556_{210}*c_{210}$. In the preceding expression, $556_i$ represents the numerical value of the $i^{th}$ mid-term feature 556 for the time corresponding to the principal component. $c_i$ represents a coefficient by which the $i^{th}$ mid term feature is multiplied. In this example, $c_i$ can be any rational number, positive, negative, greater than or less than 1, including zero.

The prepared reference information set 660 of principal components 6664 can be saved as .csv format to be processed for further predictive modeling steps. Specifically, two .csv files can be created for classification. One can be used for both training and validation. The other can be used for testing. That is, in a modified information set based on 660, there can be an additional column for subset, which can be randomly filled with one of three values: train, validate, and test. This would lead to almost the same result as either cross-validation or percentage split option for validation that makes the instances of either train or validate, which account for 80% of total instances of the final information set. The other 20% becomes the test set to be used for evaluating the classification model.

As discussed above in connection with FIGS. 3 and 4, one matter that would typically need to be addressed is that the principal component reference information set 660 is almost certainly not equally, or even close to equally, balanced among the different tool wear categories of normal, trembling and deteriorating. This is because in typical use during which the reference information is captured, the time spent in normal operation vastly exceeds that spent as either trembling or deteriorating. Balancing the information set is most beneficially done after the step that reduces the number of dimensions (FIG. 4 418) from approximately two hundred and ten, to a much smaller number (for instance thirty-two), referred to above in connection with the discussion of FIG. 3 and the principal component generator 318.

To correct for the imbalance, one suitable technique that can be used is known as the synthetic minority oversampling technique (SMOTE) (Wang, Xu, Wang, & Zhang, 2006). This technique effectively tackles the problems associated with the imbalanced class, and also avoids over-fitting that could make a classifier underperform. The SMOTE algorithm resamples the given dataset by using the k-Nearest Neighbors (kNN) algorithm to oversample the minority class, which in this case, is trembling, so that the dataset becomes more balanced in classes by increasing the minority's portion in class. After it applies SMOTE into the first subset, the subset becomes more balanced with the increased number of minority class.

Another issue that must be addressed is that the increased instances of the minority class should be randomly distributed throughout the entire information set, to avoid over-fitting when conducting cross-validation. For instance, if the information set contains 460 instances of trembling class only at the end of it, it is highly likely to over-fit when either 10-fold or 5-fold cross-validation is performed, because some folds are highly likely to have only one class, either majority or minority class. After applying the randomize algorithm into the dataset, each class has been spread out sufficiently and is ready for the next step. In the subsequent discussion, the balanced principal component reference information set is identified in FIG. 10 as 1060. It will have a larger plurality z of rows $664_n$, than the plurality M of rows $664_m$ in the unbalanced principal component reference information set 660.

Select Principal Components

The important steps of principal component selection 422 (FIG. 4) are discussed next. In this case, the items being selected are the principal components, discussed above. In industries that deal with this sort of information processing and selection, the somewhat generic term feature selection is used for this type of technique. However, it is important to recall that above, the term feature, is used to refer to concepts known as short term features and mid term features, which are notions that relate very directly to the sound information considered over first relatively short periods of times, and then, an amalgamation of those short periods of time into relatively longer, medium or mid-term durations of time. The techniques discussed below are referred to as PC selection (principal component selection) to insure that it is not mistakenly thought to refer to selection of either short term or mid-term features, as identified above. But skilled persons in an art of information processing and classifier use may think of the following PC (principal component) selection as what may be more commonly known as feature selection.

The details of PC selection and classification are discussed here together. As discussed above, PC selection helps find the best subset of principal components that result in the highest accuracy for a classifier, or rank the principal components one by one in terms of statistical test value without changing them. By conducting the PC selection, the final balanced principal component reference information set 1060 and classifier is likely to avoid over-fitting because of fewer redundant items (principal components) that minimize the noise effects on the classifier's performance, which means accuracy, and that also shortens computational training time, as well as computation time during the pattern matching aspects of inventions hereof. PC selection makes a noise-robust model, enhancing generalization and reducing the chances of over-fitting, along with dimensionality reduction techniques. There are three methods that are widely used for PC (known as feature) selection: the filter, wrapper, and embedded methods. Each is discussed below, however, the wrapper method is considered to be especially useful for inventions disclosed herein.

A filter method uses a proxy measure such as correlation, instead of accuracy, and excludes the principal components that are in lower ranks. Then the selected principal components in higher ranks would be used for classification. Because the classifier is disregarded when selecting principal components, the filter method can be used effectively when there is a large volume of information in the sets, taking advantage of fast computational time and robustness to over-fitting. By large volume of information in the sets, it is meant a large number of rows in a matrix representation of the information set, as shown for instance at 1060. In other words, a filter method selects principal components in higher ranks above the cutoff point through cross-validation by using statistical tests based on discriminating criteria that are relatively independent of classification. Thus, a filter method generally leads to lower predictive power of a classification model than a wrapper method does, as discussed below, because a filter method is independent of learning algorithms. But a filter method is relatively robust against over-fitting compared to a wrapper method. Therefore, a filter method is typically used for the purpose of preprocessing to reduce redundancy.

In contrast to a filter method, a wrapper method, such as described in (Ladha & Deepa, 2011), generates all possible subsets from the given principal components, by using a subset evaluator. A wrapper method helps determine the best subset of principal components that gives the best accuracy for classification (Guyon, 2005). Specifically, with a wrapper method, it scores the predictive accuracy of all the possible subsets of principal components by using the error rate of the classifier and determines the best subset by using a searching method, such as exhaustive search, scatter search, and greedy search (e.g. greedy forward, backward, or bidirectional) that finds a local optimum, such as discussed in (Witten, 2014), which adds the best principal components or deletes the worst principal components at each round. Compared to a filter method, a wrapper method tends to perform better in terms of classification accuracy because a wrapper method optimizes and finds the best subset of principal components tuned to the classification technique. (Chathuranga & Jayaratne, 2013).

Due to the calculational characteristics of a wrapper method, it is highly likely to over-fit and has relatively high complexity in computation, as compared to a filter method. But a wrapper method is very effective to identify the best subset of principal components that lead to the highest accuracy of classification rules. A traditional principal component (feature) selection technique for a wrapper method is stepwise regression.

The third known method for feature/principal component selection is called an embedded method, as described in (Lal, Chapelle, Weston, & Elisseeff, 2006). An embedded method differs from the above filter and wrapper methods, in terms of a so-called learning process. As mentioned previously, a wrapper method employs a sort of learning process to identify the best subset of principal components, but a filter method does not have any learning process. In contrast to both, with an embedded method, it is hard to distinguish between the learning process and the principal component selection process, and an embedded method is less vulnerable to over-fitting with less computation than a wrapper method. A well-known embedded method is LASSO, as described in (Lal, Chapelle, Weston, & Elisseeff, 2006), which is usually used for making a linear model.

Among the three methods just discussed, a wrapper method is generally preferred for use with inventions hereof because robust Principal Component analysis (PCA), as the dimensionality reduction technique, discussed above, has already been conducted so that information dimension has been reduced sufficiently (in the example discussed, from two-hundred and ten down to thirty-two). Thus, a filter method is not required as the preprocessing step, because noise filtering and dimensionality reduction have already been performed. Also, as described, a wrapper method typically leads to better classification accuracy than other methods. As the searching method for the wrapper method, the best-first search method, which uses the greedy approach to take the locally best subset, is employed (Brown, 2007).

By applying a wrapper method of feature selection to the information set, which has already become relatively well-balanced in terms of distribution of class values by applying some balancing steps, such as SMOTE, discussed above, all possible subsets of the principal component reference information set are generated, based on several different classifiers.

Turning now to a detailed discussion related to selecting and using classifiers, in one example of implementation of inventions hereof, eight classifiers were investigated, as set forth in the Table 2 below. All eight classifiers are known in other audio contexts to be effective in obtaining higher accuracy of classification. Other classifiers, either known, or as developed, can be similarly evaluated and tested. One ore more classifiers other than the eight mentioned here for illustrative purposes could be used with inventions hereof.

TABLE 2

CLASSIFIERS

| No. | CLASSIFIER |
|---|---|
| 1 | Naïve Bayes (Fu, Lu, Ting, & Zhang, 2010) |
| 2 | Multi-Class Support Vector Machine (SVM) (Chen, Gunduz, & Ozsu, 2006) (Lu, Zhang, & Li, 2003) (Sequential Minimal Optimization (SMO) (Platt, 1998)) |
| 3 | Multi-Class Alternative Decision Tree (LADTree) (Holmes, Pfahringer, Kirkby, Frank, & Hall, 2002) (Freund & Mason) |
| 4 | Multinomial Logistic Regression (Misdariis, Minard, Susini, Lemaitre, McAdams, & Parizet, 2010) |
| 5 | k-Nearest Neighbors (kNN) (Gonzalez, 2012) (Lu, Zhang, & Jiang, 2002) (Zhang & Zhou) (Instance Based method on kNN: IBK) |
| 6 | Decision Tree (J48 (Quinlan, 1993)) |
| 7 | Bagging (REPTree) (Theodorou, Mporas, & Fakot, 2012) |
| 8 | Artificial Neural Networks (ANNs): Multi-Layer Perceptron (MLP) (Balochian, Seidabad, & Za, 2013) |

The associated rules for determining which patterns of coefficients of principal components correspond with which tool condition labels, for each classifier, referred to herein for short-hand purposes as the classification model, was created for each classifier, using ten-fold cross-validation. A test information set was supplied for estimating prediction accuracy. Ten-fold cross-validation can help avoid over-fitting and make predictions generalizable when building a set of rules for a specific classifier. Ten-fold cross-validation has been proved to be effective and to result in the best accuracy from extensive experiments conducted in the field of data science. There is also some theoretical evidence for it as set forth in (Witten, Frank, & Hall, 2011). Also using a test information set, which is independent of the training/validation information set, plays an important role in evaluating prediction performance of the set of rules for a given classifier by looking at accuracy as well as model variance.

Eight classifiers have been considered and evaluated in an example implementing inventions hereof. (It should be noted that none of these classifiers are known to have been used for classifying or analyzing audible sounds in any machine tool settings or applications, nor is it believed that it would have been obvious to do so. They were selected for various reasons, after much study and consideration.) Two, Multi-Class Alternative Decision Tree (LADTree) and Decision Tree (J48), were selected because they are popular with skilled persons working with machine learning. The other six classifier: Naïve Bayes; Multi-Class Support Vector Machine (Sequential Minimal Optimization (SMO)); Multinomial Logistic Regression; k-Nearest Neighbors (Instance Based method on kNN: IBK); Bagging (REPTree); and Artificial Neural Networks (ANNs): Multi-Layer Perceptron (MLP), were each chosen due to their known effectiveness classifying certain types of signals. Examples of such other types of signals include waveform signals, such as music, audio, environmental sound, and speech. Several of these were also of interest for additional reasons. The multi-class support vector machine classifier optimizes very quickly compared to other classifiers. The LADTree classifier applies a logistic boosting method into decision trees, so that the method ends up having the prediction accuracy of Boosting. The REPTree classifier has shown relatively high accuracy in audio classification of broadcast news information. The multi-layer perceptron classifier has also shown effectiveness in audio and speech classification research.

There are many metrics known for classifier evaluation, including: accuracy, Kappa statistic, mean absolute error, root mean square error, Receiver Operating Characteristic Curve (ROC curve), TP rate, FP rate, precision, recall, F-measure, and confusion matrix. Thus, depending on the classifier used, one or more metrics may be more or less appropriate for classifier evaluation. Among the metrics, some, such as TP rate, FP rate, precision, recall, and F-measure, are generally considered as effective for a case of single class, and some metrics, such as accuracy and Kappa statistic, are widely used for multi-class cases. Generally, AUC, which is the area under ROC, is a more robust measure than accuracy, if the classifier is built on an imbalanced information set, and it stands to reason that the classifier will rank a randomly chosen positive case higher than a negative case, so a larger area is better. According to a simplicity principle called Occam's Razor, among given classifiers with the same conditions, the better classifier is the simplest one, so that the best classifier should be of relatively low complexity. Also, the best classifier should have high accuracy as well as high ROC. Therefore, the two metrics, accuracy and ROC area, are selected for classifier evaluation.

As noted above, the balanced principal component reference information set 1060, prepared for principal component selection is composed of thirty-two attributes, which stand for the thirty-two principal components derived from PCA, and a plurality of instances based on the duration of the sample, each with a label that can be one of three different classes, such as in this example, normal, trembling, and deteriorating. Through the wrapper method, the best subset of these thirty-two principal components for each classifier being tested was identified, as shown in Table 3 below, and each subset can be used for classification. Because the best subsets are identified based on the accuracy of each classifier, the same classifier and the associated subset are used for classification.

TABLE 3

BEST PC SUBSET FOR EACH CLASSIFIER

| Classifier | Attributes in the best subset | # PCs in the best subset |
|---|---|---|
| Naïve Bayes | PC: 2, 3, 4, 5, 6, 7, 9, 11, 12, 13, and 14 | 12 |
| Multi SVM | PC: 1, 2, 3, 4, 5, 6, 7, 8, 9, 10, 11, 14, 15, 16, 19, 20, 21, 22, 23, 24, 26, 27, 28, 29, and 31 | 25 |
| LADTree | PC: 1, 2, 3, 4, 7, and 16 | 6 |
| Multi-Logistic Regression | PC: 1, 2, 3, 4, 5, 6, 7, 8, 9, 10, 11, 12, 13, 14, 15, 16, 17, 19, 20, 21, 22, 23, 24, 25, 26, 27, 28, 29, 30, 31, and 32 | 31 |
| kNN | PC: 1, 2, 3, 5, 6, 7, 10, 11, 13, 15, 17, 18, 20, 21, 23, and 27 | 16 |
| J48 | PC: 1, 2, 3, 4, 5, 6, 7, 8, 9, 10, 11, 13, 15, 17, 21, 23, 25, 27, 29, and 32 | 20 |
| Bagging | PC: 1, 2, 3, 4, 5, 7, 9, 10, 14, 17, 19, 22, 23, 30, and 32 | 15 |
| ANNs | PC: 1, 2, 3, 4, 5, 6, 7, 8, 9, 10, 11, 12, 13, 14, 15, 16, 17, 18, 19, 20, 21, 22, 23, 24, 25, 26, 27, 30, and 31 | 29 |

The accuracy of these classifiers as applied to a test set of information is set out below.

The accuracy of the best Naïve Bayes classifier is 82.77% on the training/validation set and 80.06% on the test set.

The accuracy of the best Multi-Class Support Vector Machine (SVM) classifier is 88.19% on the training/validation set and 88.55% on the test set.

The accuracy of the best Multi-Class Alternative Decision Tree (LADTree) classifier is 81.41% on the training/validation set and 81.71% on the test set.

The accuracy of the best Multinomial Logistic Regression classifier is 89.13% on the training/validation set and 89.63% on the test set.

The accuracy of the best k-Nearest Neighbors (kNN) classifier is 96.74% on the training/validation set and 95.54% on the test set. For the k value in the kNN classifier, it is set to 7 by looking at the error rate of the classifier as it changes from 1 to 10.

The accuracy of the best Decision Tree (J48) classifier is 93.20% on the training/validation set and 93.23% on the test set.

The accuracy of the best Bagging (REPTree) classifier is 94.00% on the training/validation set and 93.88% on the test set.

The accuracy of the best Artificial Neural Networks (ANNs) classifier is 97.04% on the training/validation set and 96.54% on the test set.

To assess the predictive performance of classifiers, metrics in the model output from the test information set are used.

TABLE 4

CLASSIFIER COMPARISON

| Classifier | Naïve Bayes | Multi-SVM | LADTree | Multi-Logistic Regression | kNN | J48 | Bagging | ANN |
|---|---|---|---|---|---|---|---|---|
| Accuracy (%) | 80.06 | 88.55 | 81.71 | 89.63 | 95.54 | 93.23 | 93.88 | 96.54 |
| Kappa Statistic | 0.66 | 0.8 | 0.68 | 0.82 | 0.92 | 0.88 | 0.89 | 0.94 |
| Mean absolute error | 0.17 | 0.25 | 0.18 | 0.1 | 0.04 | 0.05 | 0.08 | 0.03 |
| Root mean squared error | 0.31 | 0.32 | 0.3 | 0.22 | 0.14 | 0.21 | 0.18 | 0.14 |
| TP Rate | 0.8 | 0.89 | 0.82 | 0.9 | 0.96 | 0.93 | 0.94 | 0.97 |
| FP Rate | 0.14 | 0.08 | 0.14 | 0.08 | 0.03 | 0.05 | 0.05 | 0.03 |

TABLE 4-continued

CLASSIFIER COMPARISON

| Classifier | Naïve Bayes | Multi-SVM | LADTree | Multi-Logistic Regression | kNN | J48 | Bagging | ANN |
|---|---|---|---|---|---|---|---|---|
| Precision | 0.81 | 0.89 | 0.82 | 0.9 | 0.96 | 0.93 | 0.94 | 0.97 |
| Recall | 0.8 | 0.89 | 0.82 | 0.9 | 0.96 | 0.93 | 0.94 | 0.97 |
| F-Measure | 0.8 | 0.89 | 0.82 | 0.9 | 0.96 | 0.93 | 0.94 | 0.97 |
| ROC Area | 0.91 | 0.92 | 0.91 | 0.97 | 0.996 | 0.95 | 0.99 | 0.99 |

Among the metrics in Table 4, accuracy and ROC Area are selected for classifier evaluation, so the best classifier should have high accuracy as well as high ROC. Among the eight classifiers, kNN and ANNs show the best performance in terms of accuracy (95.54% for kNN and 96.54% for ANNs) and ROC (0.99 for both).

The classification results demonstrate that incipient cutting tool deterioration during the CNC machining process can be detected using the methods and apparatus disclosed herein by monitoring the human audible cutting sound. Further, it shows that cutting tool deterioration in a CNC machining center is highly likely to be detected in the early and medium stages of tool wear by the methods and apparatus disclosed herein, from human audible sound information. This can result in more reliability for automated manufacturing.

Data Structures During Pattern Matching

As discussed above, during performance of pattern matching aspects of inventions hereof, such as shown with reference to FIGS. 9 and 10, information is generated, manipulated, compared to a balanced reference information set such as 1060, and action is taken, such as either stopping operation of the machine 926 (FIG. 9) or letting it run, and returning to a sound signal collection step 906. The signals and data structures present during these steps are illustrated schematically with reference to FIG. 10. The concepts are similar to those shown with reference to FIGS. 5, 6 and 7.

In the machining center, the audio signal is sliced into signals of relatively short term duration, defined by short term frames 1052. The same short term features as were extracted from short term frames during creation of the balanced reference principal component information set 1060 (FIG. 10) are extracted, such as thirty-five short term features, including zero-crossing rate, entropy of energy, etc., shown in Table 1 above. A mid-term frame 1054 is composed by taking the same six statistical measures as were done during creation of the balanced reference principal component information set 1060, such as mean of zero-crossing rate, mean of entropy energy, etc., as discussed above, to result in two-hundred and ten mid-term features, 1056$_1$, 1056$_2$, . . . 1056$_{210}$ of mid term frame 1054.

In the pattern matching aspect of inventions hereof, a single mid-term frame 1054 is treated alone, one at a time, in a stream of such mid-term frames, one after another, during the entire time that the cutting tool is shaping material. As shown schematically in FIG. 10, each frame of mid-term duration 1054, composed of its two hundred and ten items, can be thought of as a table, as shown at 1054, or as a vector 1056. Both have two hundred and ten elements 1056$_1$, 1056$_2$, . . . 1056$_{210}$, each of which elements is a number, each of which corresponds to an aspect of the mid-term frame, such as mean of energy, mean of zero-crossing rate, etc. As discussed above, in connection with generating the principal component reference information set of patterns, each mid-term frame of two hundred and ten elements 1056 can be transformed into a vector 1074 of principal components, each vector having thirty-two elements, 1076$_1$, 1076$_2$, . . . 1076$_{32}$. Each of the thirty-two principal components is created by applying a different transformation to the mid-term vector 1056, each transformation having two hundred and ten coefficients of a linear expression, as described above, which generates a single one 1076$_i$ of the thirty-two principal components of the principal component vector 1074.

But, as has been discussed above, any given classifier 822 (FIG. 8) will likely not need to consider all thirty-two of the principal components 1076$_1$, 1076$_2$, . . . 1076$_{32}$. Rather, any given classifier likely needs only consider a subset of selected principal components, for instance ranging in number from six to thirty-one, as set forth in Table 3. Thus, to save time and computation, when the system creates the vector 1074 of principal components, it need not evaluate the expressions for the principal components that are not selected. Thus, it need only evaluate between six and thirty-one principal component expressions. This is shown schematically with the selectively evaluated vector 1074$_s$ which shows only a selected fraction of all of the principal components, indicated by cross-hatching, as being evaluated, in this example, the first, third, several internal components, and then the thirtieth, thirty-first and thirty-second. Thus, for each of the cross-hatched, selected principal components, a numerical value will be generated for the corresponding principal components. For the non-selected components, no values will be generated. Thus, computation is saved in both the creation of the principal component vector for evaluation, and in the comparison of it to corresponding patterns in the balanced reference principal component information set 1060.

Finally, the classifier uses the balanced principal component reference information set 1060, generated in the pattern generating aspect of inventions hereof, discussed above. This information set has numerous vectors, each representing a theoretical instance of a mid-term frame of tool operating sound information, with numerical values for each of the (in this example) thirty-two principal components and also a tool condition label (e.g., normal, trembling, deteriorating) associated with those numerical values. The number of such vectors can be in the tens, hundreds or thousands, depending on how many are needed to distinguish among the various patterns. The classifier uses the principal component reference information set, and applies its rules of comparison, to compare the industrial information vector 1064$_s$. The classifier need only consider the fewer than thirty-two selected principal components attributable to each mid-term frame. Although the balanced principal component reference information set 1060 has values, or may have values, in each of the thirty-two elements for each mid-term derived vector $1064_m$, only the selected principal components need be evaluated and compared to those in the balanced principal component reference information set. If a comparison reveals that the pattern of numbers in a mid-term industrial vector $1074_s$ matches a pattern of a vector $1064_n$ of the balanced principal component reference information set 1060 that corresponds to a label of deteriorating or trembling, the system decides at step 924 to stop 926 the machine from cutting material. If not, it does nothing regarding the CNC machine, thus allowing it to continue shaping, returns the operation to the step 906 and collects sound signals again, and again follows the steps shown in FIG. 9.

This disclosure describes and discloses more than one invention. The inventions are set forth in the claims of this and related documents, not only as filed, but also as developed during prosecution of any patent application based on this disclosure. The Applicant intends to claim all of the various inventions to the limits permitted by the prior art, as it is subsequently determined to be. No feature described herein is essential to each invention disclosed herein. Thus, the Applicant intends that no features described herein, but not claimed in any particular claim of any patent based on this disclosure, should be incorporated into any such claim.

For instance, the inventions can be used with any sort of material shaping tool that makes audible sounds while shaping, including, but not limited to milling machines, lathes, saws, drills, turning lathes, grinders, sanders, shapers, planes, etc. The inventions of a method and apparatus for generating patterns of sound related reference information can be used together, with the apparatus being used to conduct the method steps. Or, perhaps, the method steps might be conducted by other apparatus. Similarly, the method and apparatus for matching patterns of sound related information would typically be used to match patterns to a reference information set created using the methods just described, although, conceivably, they could be used with a reference information set created by some other means.

Various method steps and corresponding hardware have been discussed as if each hardware item is a separate, stand-alone device. For instance: noise reduction and a noise-reducer; feature extraction and a feature extractor; principal component generation and a principal component generator; information set balancing and an information set balancer; principal component selection and a principal component selector; classification and a classifier. Each of these items can be a dedicated hardware element, either in analogue or digital form. Or, any one or more than one of these items can be implemented as a properly programmed specialty or general purpose computer, either in whole or in part. Whether to implement the functions in software and a general purpose computer (or even a quantum computer) or in hardware, will depend on the data storage, speed, calculation, etc. needs of the particular task at hand, as well as the then current cost and availability of computing power, capacity and speed.

The same implementation considerations also apply to the related but fewer method steps and apparatus items used in connection with the pattern matching industrial machine center aspects of inventions hereof, in particular, to noise-reduction, feature extraction, select principal component generation and classification.

With respect to many of these concepts, several options for implementation have been discussed, with one of the options having been singled out as particularly useful. Such singling out has been made under current (2016-2017) capacities for computation, memory storage, internet communication volume and speed capacities, etc. Such considerations may change with technical advances in any of those areas, at which point, the preference for choice of options may change. In particular, the following techniques have been identified as currently preferred, but this may change: noise reduction by profiling; dimensional reduction by robust principal component analysis; information set balancing using SMOTE; principal component selection using a wrapper method; and classification using any one of eight specific classifiers. Any one of these singled-out methods can be beneficially used alone, or in conjunction with any one or all of the other specifically mentioned techniques.

Some assemblies of hardware, or groups of steps, may be referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

CITATIONS

The following provides the full citations to the articles and papers and items identified in short citation form above by authors' name and year of publication.

Aelst, S. V., Vandervieren, E., & Willems, G. (2010). Robust Principal Component Analysis Based on Pairwise Correlation Estimators. Proceedings of COMPSTAT'2010: 19th International Conference on Computational Statistics (p. 573). Paris, France: Physica-Verlag, A Springer Company.

Balochian, S., Seidabad, E. A., & Za, S. (June, 2013). Neural Network Optimization by Genetic Algorithms for the Audio Classification to Speech and Music. International Journal of Signal Processing, Image Processing and Pattern Recognition, Vol. 6, No. 3.

Bello, J. P., & Pickens, J. (2005). A Robust Mid-level Representation for Harmonic Content in Music Signals. Retrieved from Centre for Digital Music Queen Mary, University of London: http://www-labs.iro.umontreal.ca/~pift6080/H09/documents/papers/Bello-ISMIR-2005.pdf Brown, K. L. (2007, Jan. 19). Heuristic Search, CPSC 322 Lecture 6. Retrieved from CPSC 322—Introduction to Artificial Intelligence (Term 2, Session 201, 2007), Professor Kevin Leyton-Brown's Teaching material: https://www.cs.ubc.ca/~kevinlb/teaching/cs322%20-%202006-7/Lectures/lect6.pdf Chathuranga, Y. M., & Jayaratne, K. L. (July 2013). Automatic Music Genre Classification of Audio Signals with Machine Learning Approaches. GSTF International Journal on Computing (JoC), Vol. 3 No. 2.

Chen, L., Gunduz, S., & Ozsu, T. M. (2006). MIXED TYPE AUDIO CLASSIFICATION WITH SUPPORT VECTOR MACHINE. Retrieved from http://web.itu.edu.tr/~sgunduz/papers/ICME06.pdf Cunningham, J. P., & Ghahramani, Z. (2015). Linear Dimensionality Reduction: Survey, Insights, and Generalizations. Journal of Machine Learning Research 16 (2015) 2859-2900, 2859-2900.

Ellis, D. P. (2007). Classifying music audio with timbral and chroma features. ISMIR-07, (pp. pp. 339-340). Vienna, Austria. Retrieved from LabROSA, Deptment of Electrical Engineering, Columbia University: https://www.ee.columbia.edu/~dpwe/pubs/Ellis07-timbrechroma.pdf Fernandez, G. (n.d.). Principal Component Analysis. Retrieved from http://www.cabnr.unr.edu/Saito/classes/ers701/pca2.pdf Fodor, I. K. (2002, June). A survey of dimension reduction techniques. Retrieved from Center for Applied Scientific Computing, Lawrence Livermore National Laboratory: https://computation.llnl.gov/casc/sapphire/pubs/148494.pdf Freund, Y., & Mason, L. (n.d.). The alternative decision tree learning algorithm. Retrieved from http://cseweb.ucsd.edu/~yfreund/papers/atrees.pdf Fu, Z., Lu, G., Ting, K., & Zhang, D. (2010). Learning Naive Bayes Classifiers for Music Classification and Retrieval. Pattern Recognition (ICPR), 20th International Conference (pp. Page: 4589-4592, ISSN: 1051-4651). IEEE.

Giannakopoulos, T., & Pikrakis, A. (2014). Introduction to Audio Analysis: A MATLAB Approach. Academic Press (An imprint of ELSEVIER).

Giannakopoulos, T., Smailis, C., Perantonis, S., & Spyropoulos, C. (2014). Realtime depression estimation using mid-term audio features. The 3rd International Workshop on Artificial Intelligence and Assistive Medicine (pp. 41-45). Prague, Czech Republic: CEUR-WS.org/Vol-1213.

Gonzalez, R. (2012). Better than MFCC Audio Classification Features. Retrieved from Griffith Research Online: http://www98.griffith.edu.au/dspace/bitstream/handle/10072/54461/81896_1.pdf?sequence=1

Guyon, I. (2005, Dec. 15). Lecture 8: Wrappers. Retrieved from Feature Extraction, (winter semester 2005/2006) course material, Isabelle Guyon's home page: http://clopinet.com/isabelle/Projects/ETH/lecture8.pdf Holmes, G., Pfahringer, B., Kirkby, R., Frank, E., & Hall, M. (2002). Multiclass Alternating Decision Trees. Retrieved from http://www.cs.waikato.ac.nz/~eibe/pubs/ecml2002.pdf Kim, H.-G., Moreau, N., & Sikora, T. (2005). *MPEG-7 Audio and Beyond: Audio Content Indexing and Retrieval*. John Wiley & Sons.

Ladha, L., & Deepa, T. (2011). FEATURE SELECTION METHODS AND ALGORITHMS. International Journal on Computer Science and Engineering (IJCSE), ISSN: 0975-3397 Vol. 3 No. 5 page 1787-1797.

Lal, T. N., Chapelle, O., Weston, J., & Elisseeff, A. (2006). Chapter 5: Embedded Methods. In I. Guyon, S. Gunn, M. Nikravesh, & L. A. Zadeh, Feature Extraction: Foundations and Applications: STUDIES IN FUZZINESS AND SOFT COMPUTING Volume 207 (pp. 137-162). Heidelberg: Springer.

Lee, K. (2006). Automatic Chord Recognition from Audio Using Enhanced Pitch Class Profile. International Computer Music Conference, (pp. 306-313). Retrieved from Kyogu Lee's webpage, Center for Computer Research in Music and Acoustics (CCRMA), Department of Music, Stanford University.

Lu, L., Zhang, H.-J., & Li, S. (2003). Content-based audio classification and segmentation by using support vector machines. Retrieved from https://pdfs.semanticscholar.org/82c8/395bfed427703118b8f6f328272384215417.pdf Misdariis, N., Minard, A., Susini, P., Lemaitre, G., McAdams, S., & Parizet, E. (2010). Environmental sound perception: meta-description and modeling based on independent primary studies. EURASIP Journal on Audio, Speech, and Music Processing.

Osuna, R. R.-O. (2002). CS 790: Selected Topics in Computer Science, Lecture 5: Dimensionality reduction (PCA). Retrieved from Texas A&M University Computer Science and Engineering Department CS Course Webpages: http://courses.cs.tamu.edu/rgutier/cs790_w02/15.pdf Platt, J. C. (1998, Apr. 21). Sequential Minimal Optimization: A Fast Algorithm for Training Support Vector Machines, Technical Report MSR-TR-98-14. Retrieved from http://research.microsoft.com/pubs/69644/tr-98-14.pdf Quinlan, R. (1993). C4.5: Programs for Machine Learning. Morgan Kaufmann Publishers, San Mateo, Calif. Retrieved from https://pdfs.semanticscholar.org/9763/a48ba1782d1ae319f78a a9385a360dffd728.pdf Rai, P. (2011, Oct. 25). Professor Piyush Rai's course webpage, Nonlinear Dimensionality Reduction, CS5350/6350: Machine Learning. Retrieved from The University of Utah, School of Computing: https://www.cs.utah.edu/~piyush/teaching/25-10-print.pdf Roweis, S. T., & Saul, L. K. (2000). Nonlinear Dimensionality Reduction by Locally Linear Embedding. SCIENCE VOL 290, 2323-2326.

Sturm, L. B. (2010). Paper of the Day (Po'D): Music Cover Song Identification Edition, pt. 2. Retrieved from Collective for Research in Interaction, Sound, and Signal Processing, Aalborg University Copenhagen: http://media.aau.dk/null_space_pursuits/2010/10/paper-of-the-day-pod-music-cover-song-identification-edition-pt-2.html Theodoridis, S., & Koutroumbas, K. (2008). Pattern Recognition, Fourth Edition. Academic Press, Inc.

Theodorou, T., Mporas, I., & Fakot, N. (March, 2012). Automatic Sound Classification of Radio Broadcast News. International Journal of Signal Processing, Image Processing and Pattern Recognition, Vol. 5, No. 1.

Wang, J., Xu, M., Wang, H., & Zhang, J. (2006). Classification of Imbalanced Data by Using the SMOTE Algorithm and Locally Linear Embedding. ICSP.

Witten, I. H., Frank, E., & Hall, M. A. (January 2011). Data Mining; Practical Machine Learning Tools and Techniques, Third Edition. Morgan Kaufmann Publishers (ISBN: 978-0-12-374856-0).

Xu, A., Jin, X., & Guo, P. (2006). Two-Dimensional PCA Combined with PCA for Neural Network Based Image Registration. Advances in Natural Computation, Second International Conference ICNC 2006 (pp. 697-713). Xian, China: Springer.

Zhang, M.-L., & Zhou, Z.-H. (n.d.). A k-Nearest Neighbor Based Algorithm for Multi-label Classification. Retrieved from Professor Zhi-Hua Zhou's homepage, Department of Computer Science & Technology, Nanjing University, China: http://cs.nju.edu.cn/zhouzh/zhouzh.files/publication/grc05.pdf

ASPECTS OF INVENTIONS

The following aspects of inventions hereof are intended to be described herein, and this section is to ensure that they are mentioned. They are named Aspects, and although they appear similar to claims, they are not claims. However, at some time in the future, the applicant reserves the right to claim any and all of these aspects in this and any related applications. They are styled in some cases in terms of multiple dependencies, which shows some of the many ways that the Applicant understands the invention to exist in terms of combinations of parts and subparts, whether claimed or not presently claimed.

A1. A method for generating a reference information set of CNC machine tool shaping sound related information and rules for generating tool condition labels based thereon, the method comprising the steps of:
  a. recording human audible sound while a CNC machine tool is shaping a workpiece, including during normal operation and during deteriorating operation;
  b. generating a plurality of relatively short term duration slices of the recorded sound;
  c. selecting, by a human, for each said short term duration slice of sound, a shaping tool condition label, which selection has been made by the human based on listening to the sound generated while the machine is shaping a workpiece and judging the condition of the shaping tool and selecting a tool condition label that corresponds with the judged condition, and associating the selected shaping tool condition label with the corresponding short term duration slice of sound, resulting in a labeled short term slice of sound;
  d. reducing noise in said plurality of short term duration slices of recorded labeled sound to generate a plurality of noise reduced slices of labeled sound;
  e. for each labeled short term slice of sound, extracting values of a plurality of short term features, at least one of which is a time domain feature and at least one of which is a frequency domain feature, resulting in a labeled short term slice of feature values;
  f. associating a plurality of labeled short term slices of feature values together to form a labeled mid term duration frame of sound related information;
  g. extracting from said labeled mid term duration frame of sound related information, values of a plurality F of mid term features, including at least one time domain mid term feature and at least one frequency domain mid term feature, and associating said plurality F of mid term features together to form a labeled mid term vector of values of sound related information;
  h. repeating the steps 1.a through 1.g a plurality of times, to generate a labeled feature information set of a plurality of tool condition labeled mid term vectors of values of sound related information;
  i. based on the values of the plurality of mid term features of the feature information set, generating a plurality PC of principal components, where the plurality PC is smaller than the plurality F, and then generating, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;
  j. if the principal component information set is imbalanced with respect to each of the tool condition labels, then balancing the principal component information set with respect to each of the tool condition labels to generate a balanced reference principal component information set; and
  k. choosing a specific classifier and classifying the balanced reference principal component information set with regard to the tool condition labels to generate rules that match each pattern of values of a vector of values of principal components to a single tool condition label.

A2. The method of aspect A1, further comprising steps to identify industrial tool condition, those identification steps comprising:
  a. in an industrial setting, using a CNC machine of the same type as the CNC machine that was used to generate the reference information set to shape a workpiece of the same type that was shaped to generate the reference information set, and recording human audible sound while the CNC machine tool is shaping the workpiece;
  b. generating a plurality of relatively short term duration slices of the recorded industrial sound;
  c. reducing noise in said plurality of short term duration slices of recorded industrial sound to generate a plurality of noise reduced slices of industrial sound;
  d. for each short term slice of industrial sound, extracting values of the same plurality of short term features as was used to generate said short term slice of feature values, resulting in an industrial short term slice of feature values;
  e. associating a plurality of industrial short term slices of feature values together to form an industrial mid term duration frame of sound related information;
  f. extracting from said industrial mid term duration frame of sound related information, values of the plurality F of mid term features, and associating said plurality F of mid term features together to form an industrial mid term vector of values of sound related information;
  g. based on the values of the plurality F of mid term features of the industrial mid term vector of values of sound related information, generating an industrial principal component information vector, the values of the principal components of the industrial principal component vector constituting a pattern of values; and
  h. using the rules generated by the classifier that was used to classify the reference principal component information set, applying the rules to the pattern of values of the industrial principal component vector to identify the tool condition that matches the pattern of values of the industrial principal component vector.

A3. A method for identifying tool condition of a shaping tool in an industrial setting, using a reference information set of CNC machine tool shaping sound related information and rules for generating tool condition labels based thereon, the method comprising the steps of:
  a. recording human audible sound while a CNC machine tool is shaping a workpiece, including during normal operation and during deteriorating operation;
  b. generating a plurality of relatively short term duration slices of the recorded sound;
  c. selecting, by a human, for each said short term duration slice of sound, a shaping tool condition label, which selection has been made by the human based on listening to the sound generated while the machine is shaping a workpiece and judging the condition of the shaping tool and selecting a tool condition label that corresponds with the judged condition, and associating the selected shaping tool condition label with the corresponding short term duration slice of sound, resulting in a labeled short term slice of sound;
d. reducing noise in said plurality of short term duration slices of recorded sound to generate a plurality of labeled noise reduced slices of sound;
e. for each labeled noise reduced short term slice of sound, extracting values of a plurality of short term features, at least one of which is a time domain feature and at least one of which is a frequency domain feature, resulting in a labeled short term slice of feature values;
f. associating a plurality of labeled short term slices of feature values together to form a labeled mid term duration frame of sound related information;
g. extracting from said labeled mid term duration frame of sound related information, values of a plurality F of mid term features, including at least one time domain mid term feature and at least one frequency domain mid term feature, and associating said plurality F of mid term features together to form a labeled mid term vector of values of sound related information;
h. repeating the steps 1.a through 1.g a plurality of times, to generate a labeled feature information set of a plurality of tool condition labeled mid term vectors of values of sound related information;
i. based on the values of the plurality of mid term features of the feature information set, generating a plurality PC of principal components, where the plurality PC is smaller than the plurality F, and then generating, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;
j. if the principal component information set is imbalanced with respect to each of the tool condition labels, then balancing the principal component information set with respect to each of the tool condition labels to generate a balanced reference principal component information set;
k. choosing a specific classifier and classifying the reference principal component information set with regard to the tool condition labels to generate rules that match each pattern of values of a vector of values of principal components to a single tool condition label;
l. in an industrial setting, using a CNC machine of the same type as the CNC machine that was used to generate the reference information set to shape a workpiece of the same type that was shaped to generate the reference information set, and recording human audible sound while the CNC machine tool is shaping the workpiece;
m. generating a plurality of relatively short term duration slices of the recorded industrial sound;
n. reducing noise in said plurality of short term duration slices of recorded industrial sound to generate a plurality of noise reduced slices of industrial sound;
o. for each labeled short term slice of industrial sound, extracting values of the same plurality of short term features, used to generate said short term slice of feature values, resulting in an industrial short term slice of feature values;
p. associating a plurality of industrial short term slices of feature values together to form an industrial mid term duration frame of sound related information;
q. extracting from said industrial mid term duration frame of sound related information, values of the plurality F of mid term features, and associating said plurality F of mid term features together to form an industrial mid term vector of values of sound related information;
r. based on the values of the plurality F of mid term features of the industrial mid term vector of values of sound related information, generating an industrial principal component information vector, the values of the principal components of the industrial principal component vector constituting a pattern of values; and
s. using the rules generated by the classifier that was used to classify the reference principal component information set, applying the rules to the pattern of values of the industrial principal component vector to identify the tool condition that matches the pattern of values of the industrial principal component vector.

A4. The method of any one of aspects A2 and A3, further comprising the step of testing the identified tool condition and, if the tool condition is normal, continuing to use the CNC machine to shape the workpiece, else, stop using the CNC machine to shape the workpiece.

A5. The method of any one of aspects A2 and A3, the step of reducing the noise in said plurality of short term duration slices of recorded industrial sound comprising:
 a. before the step of, in an industrial setting using the CNC machine to shape a workpiece;
  i. operating the CNC machine tool in the industrial setting when the shaping tool is not shaping material;
  ii. recording human audible sound while the CNC machine tool in the industrial setting is operating and not shaping material;
  iii. based on the recording of sound while the machine tool in the industrial setting is not shaping material, generating a profile of noise that relates to sounds in the industrial setting other than shaping material; and
 b. combining the noise profile with the plurality of relatively short term duration slices of the recorded industrial sound in a manner that reduces the effect of noise that relates to industrial sounds other than shaping material.

A6. The method of any one of aspects A1, A2 and A3, the step of classifying comprising selecting a specific classifier to apply to the reference principal component information set, further comprising the steps of:
 a. identifying at least two subsets of principal components;
 b. evaluating each of the subsets of principal components with the classifier to determine which subset of principal components works best with the classifier; and
 c. designating the principal components of the subset that works best as selected principal components.

A7. The method of any one of aspects A1, A2 and A3, the step of classifying comprising selecting a classifier, the step of selecting a classifier comprising:
 a. selecting a plurality of different classifiers;
 b. evaluating each of the classifiers using the balanced reference principal component information set, and based on the evaluation, identifying one of the classifiers as the best.

A8. The method of aspect A7, the step of evaluating each classifier being selected from the group consisting of: evaluating each classifier's accuracy; and evaluating, for each classifier, ROC area.

A9. The method of any one of aspects A1, A2 and A3, the step of reducing noise comprising:
  a. operating the CNC machine tool when the shaping tool is not shaping material;
  b. recording human audible sound while the CNC machine tool is operating and not shaping material;
  c. based on the recording of sound while the machine tool is not shaping material, generating a profile of noise that relates to sounds other than shaping material; and
  d. combining the noise profile with the plurality of relatively short term duration slices of the recorded sound in a manner that reduces the effect of noise that relates to sounds other than shaping material.

A10. The method of any one of aspects A1, A2 and A3, the step of balancing the principal component information set with respect to each of the tool condition labels comprising applying a SMOTE method to the principal component information set to generate a balanced principal component information set.

A11. The method of any one of aspects A1, A2 and A3, the step of generating a smaller plurality of principal components, comprising applying Robust principal component analysis to the feature information set.

A12. The method of aspect A6, said step of evaluating each of the subsets of principal components with the classifier to determine which subset of principal components works best with the classifier comprising applying a wrapper method.

A13. The method of aspect A7, the step of selecting a plurality of different classifiers comprising selecting a classifier from the group consisting of: Naïve Bayes, Multi-Class Support Vector Machine (SVM); Multi-Class Alternative Decision Tree (LADTree); Multinomial Logistic Regression; k-Nearest Neighbors (kNN); Decision Tree; Bagging (REPTree) and Artificial Neural Networks.

A14. The method of any one of aspects A1, A2 and A3, the step of selecting a shaping tool condition label comprising judging the condition of the shaping tool with respect to at least one additional operating condition in addition to normal and deteriorating operation.

A15. The method of any one of aspects A1, A2 and A3, said plurality of short term features being selected from the group consisting of: zero-crossing rate; entropy of energy; energy; first thirteen Mel-frequency Cepstral Coefficients; spectral entropy; spectral rolloff; spectral centroid; spectral spread; spectral flux; harmonic pitch class profiles; and a twelve element chroma vector.

A16. The method of aspect A5, the mid term features being selected from, for any one of said short term features, taking any statistical treatment of the group consisting of: mean, median, standard deviation, standard deviation by mean, maximum, and minimum.

A17. An apparatus for generating a reference information set of CNC machine tool shaping sound related information and rules for generating tool condition labels based thereon, the method comprising:
  a. a recorder, configured for recording human audible sound while a CNC machine tool is shaping a workpiece, including during normal operation and during deteriorating operation;
  b. coupled to the recorder, a time-wise audio signal slicer, configured to generate a plurality of relatively short term duration slices of the recorded sound;
  c. a tool condition labeler, configured to assign, to each said short term duration slice of sound, a shaping tool condition label, which shaping tool condition label has been selected by a human operator based on listening to the sound generated while the machine is shaping a workpiece and judging the condition of the shaping tool and selecting a tool condition label that corresponds with the judged condition, and assigning the selected shaping tool condition label to the corresponding short term duration slice of sound, resulting in a labeled short term slice of sound;
  d. a noise reducer, configured to reduce noise in said plurality of short term duration slices of recorded sound to generate a plurality of noise reduced slices of sound;
  e. coupled to the noise reducer, a feature extractor, comprising:
    i. a short term analyzer, configured to, for each labeled short term slice of sound, extract values of a plurality of short term features, at least one of which is a time domain feature and at least one of which is a frequency domain feature, resulting in a labeled short term slice of feature values;
    ii. coupled to the short term analyzer, a mid term generator, configured to:
      A. associate a plurality of short term slices of feature values together to form a labeled mid term duration frame of sound related information;
      B. extract from said labeled mid term duration frame of sound related information, values of a plurality F of mid term features, including at least one time domain mid term feature and at least one frequency domain mid term feature, and associate said plurality F of mid term features together to form a labeled mid term vector of values of sound related information; and
      C. to repeatedly form mid term duration frames of sound related information and extracting from each formed mid term duration frame of sound information, mid term features and associate each said plurality F of mid term features together to form a plurality of labeled mid term vectors of values of sound related information to generate a labeled feature information set of a plurality of tool condition labeled mid term vectors of values of sound related information;
  f. coupled to said feature extractor, a principal component generator, configured to, based on the values of the plurality of mid term features of the feature information set, generate a plurality PC of principal components, where the plurality PC is smaller than the plurality F, and then generate, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;
  g. coupled to the principal component generator, an information set balancer, configured to, if the principal component information set is imbalanced with respect to each of the tool condition labels, then balancing the principal component information set with respect to each of the tool condition labels to generate a balanced reference principal component information set; and
  h. a classifier configured to classify the reference principal component information set with regard to the tool condition labels to generate rules that match each pattern of values of a vector of values of principal components to a single tool condition label.

A18. An apparatus for controlling an industrial CNC machine tool to cease shaping a workpiece, based on shaping tool condition, comprising:
   a. a recorder, configured for recording human audible sound while an industrial CNC machine tool is shaping a workpiece;
   b. coupled to the recorder, a time-wise audio signal slicer, configured to generate a plurality of relatively short term duration slices of the industrial recorded sound;
   c. coupled to the audio signal slicer, a noise reducer, configured to reduce noise in said plurality of short term duration slices of industrial recorded sound to generate a plurality of industrial noise reduced slices of sound;
   d. coupled to the noise reducer, a feature extractor, the feature extractor comprising:
      i. a short term analyzer, configured to, for each industrial short term slice of sound, extract values of a plurality of short term features, at least one of which is a time domain feature and at least one of which is a frequency domain feature, resulting in an industrial short term slice of feature values;
      ii. coupled to the short term analyzer, a mid term generator, configured to:
         A. associate a plurality of industrial short term slices of feature values together to form an industrial mid term duration frame of sound related information;
         B. extract from said industrial mid term duration frame of sound related information, industrial values of a plurality F of mid term features, including at least one time domain mid term feature and at least one frequency domain mid term feature, and associate said plurality F of industrial values of mid term features together to form an industrial mid term vector of values of sound related information;
   e. coupled to said feature extractor, a select principal component generator, configured to, based on the values of the plurality of mid term features of the industrial mid term vector, generating an industrial select principal component vector of values of select principal components, the values of select principal components of said industrial select principal component vector constituting an industrial pattern of values;
   f. coupled to the select principal component generator, a classifier configured to classify the industrial select principal component vector with respect to the condition of the shaping tool at the time the sound from which the industrial principal component vector was generated, the condition of the shaping tool being selected from the group consisting of normal and other than normal, said classification being based on:
      i. a previously prepared reference principal component information set, of a plurality of labeled mid term reference vectors of values of principal components, the values of principal components of each reference vector constituting a reference pattern of values, each reference vector also having a tool condition label associated therewith; and
      ii. a previously generated set of rules that match each pattern of values of a reference vector of values of principal components to a single tool condition label; and
   g. coupled to the classifier and the CNC machine, a shaping operation off switch, the switch configured to cease material shaping by the CNC machine if the classifier classifies an industrial principal component vector with any tool condition label other than normal.

A19. The apparatus of any one of aspects A17 and A18, the classifier comprising a specific classifier, further comprising, coupled to the information set balancer and the classifier, a principal component selector, configured to:
   a. identify at least two subsets of principal components;
   b. evaluate each of the subsets of principal components with the classifier to determine which subset of principal components works best with the classifier; and
   c. designating the principal components of the subset that works best as selected principal components.

A20. The apparatus of aspect 17, the noise reducer comprising:
   a. a noise profiler configured to create a profile of human audible sound that arises while the CNC machine tool is operating and not shaping material of;
   b. coupled to the noise profiler, a combiner, configured to combine the noise profile with the plurality of relatively short term duration slices of the recorded sound in a manner that reduces the effect of noise that relates to sounds other than shaping material.

A21. The apparatus of aspect A17, the information set balancer comprising a balancer configured to apply a SMOTE method to the principal component information set to generate a balanced principal component information set.

A22. The apparatus of aspect A17, the principal component generator comprising a generator configured to apply a Robust principal component analysis.

A23. The apparatus of aspect A19, the principal component selector comprising a wrapper method principal component selector.

A24. The apparatus of any one of aspects A17 and A18, the classifier being selected from the group consisting of: Naïve Bayes, Multi-Class Support Vector Machine (SVM); Multi-Class Alternative Decision Tree (LADTree); Multinomial Logistic Regression; k-Nearest Neighbors (kNN); Decision Tree; Bagging (REPTree) and Artificial Neural Networks.

Having described the inventions disclosed herein, what is claimed is:

1. A method for generating a reference information set of CNC machine tool shaping sound related information and rules for generating tool condition labels based thereon, the method comprising the steps of:
   a. recording human audible sound while a CNC machine tool is shaping a workpiece, including during normal operation and during deteriorating operation;
   b. generating a plurality of relatively short term duration slices of the recorded sound;
   c. selecting, by a human, for each said short term duration slice of sound, a shaping tool condition label, which selection has been made by the human based on listening to the sound generated while the machine is shaping a workpiece and judging the condition of the shaping tool and selecting a tool condition label that corresponds with the judged condition, and associating the selected shaping tool condition label with the corresponding short term duration slice of sound, resulting in a labeled short term slice of sound;
   d. reducing noise in said plurality of short term duration slices of recorded labeled sound to generate a plurality of noise reduced slices of labeled sound;

e. for each labeled short term slice of sound, extracting values of a plurality of short term features, at least one of which is a time domain feature and at least one of which is a frequency domain feature, resulting in a labeled short term slice of feature values;

f. associating a plurality of labeled short term slices of feature values together to form a labeled mid term duration frame of sound related information;

g. extracting from said labeled mid term duration frame of sound related information, values of a plurality of mid term features (F), including at least one time domain mid term feature and at least one frequency domain mid term feature, and associating said plurality F of mid term features together to form a labeled mid term vector of values of sound related information;

h. repeating the steps 1.a through 1.g a plurality of times, to generate a labeled feature information set of a plurality of tool condition labeled mid term vectors of values of sound related information;

i. based on the values of the plurality of mid term features of the feature information set, generating a plurality of principal components (PC), where the plurality PC is smaller than the plurality F, and then generating, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;

j. if the principal component information set is imbalanced with respect to each of the tool condition labels, then balancing the principal component information set with respect to each of the tool condition labels to generate a balanced reference principal component information set; and k. choosing a specific classifier and classifying the balanced reference principal component information set with regard to the tool condition labels to generate rules that match each pattern of values of a vector of values of principal components to a single tool condition label.

2. The method of claim 1, the step of classifying comprising selecting a specific classifier to apply to the reference principal component information set, further comprising the steps of:
a. identifying at least two subsets of principal components;
b. evaluating each of the subsets of principal components with the classifier to determine which subset of principal components works best with the classifier; and
c. designating the principal components of the subset that works best as selected principal components.

3. The method of claim 1, the step of classifying comprising selecting a classifier, the step of selecting a classifier comprising:
a. selecting a plurality of different classifiers;
b. evaluating each of the classifiers using the balanced reference principal component information set, and based on the evaluation, identifying one of the classifiers as the best.

4. The method of claim 3, the step of evaluating each classifier being selected from the group consisting of: evaluating each classifier's accuracy; and evaluating, for each classifier, ROC area.

5. The method of claim 1, the step of reducing noise comprising:
a. operating the CNC machine tool when the shaping tool is not shaping material;
b. recording human audible sound while the CNC machine tool is operating and not shaping material;
c. based on the recording of sound while the machine tool is not shaping material, generating a profile of noise that relates to sounds other than shaping material; and
d. combining the noise profile with the plurality of relatively short term duration slices of the recorded sound in a manner that reduces the effect of noise that relates to sounds other than shaping material.

6. The method of claim 1, the step of balancing the principal component information set with respect to each of the tool condition labels comprising applying a SMOTE method to the principal component information set to generate a balanced principal component information set.

7. The method of claim 1, the step of generating a smaller plurality of principal components, comprising applying Robust principal component analysis to the feature information set.

8. The method of claim 2, said step of evaluating each of the subsets of principal components with the classifier to determine which subset of principal components works best with the classifier comprising applying a wrapper method.

9. The method of claim 3, the step of selecting a plurality of different classifiers comprising selecting a classifier from the group consisting of: Naïve Bayes, Multi-Class Support Vector Machine (SVM); Multi-Class Alternative Decision Tree (LADTree); Multinomial Logistic Regression; k-Nearest Neighbors (kNN); Decision Tree; Bagging (REPTree) and Artificial Neural Networks.

10. The method of claim 1, the step of selecting a shaping tool condition label comprising judging the condition of the shaping tool with respect to at least one additional operating condition in addition to normal and deteriorating operation.

11. The method of claim 1, said plurality of short term features being selected from the group consisting of: zero-crossing rate; entropy of energy; energy; first thirteen Mel-frequency Cepstral Coefficients; spectral entropy; spectral rolloff; spectral centroid; spectral spread; spectral flux; harmonic pitch class profiles; and a twelve element chroma vector.

12. The method of claim 11, the mid term features being selected from, for any one of said short term features, taking any statistical treatment of the group consisting of: mean, median, standard deviation, standard deviation by mean, maximum, and minimum.

13. The method of claim 1, further comprising steps to identify industrial tool condition, those identification steps comprising:
a. in an industrial setting, using a CNC machine of the same type as the CNC machine that was used to generate the reference information set to shape a workpiece of the same type that was shaped to generate the reference information set, and recording human audible sound while the CNC machine tool is shaping the workpiece;
b. generating a plurality of relatively short term duration slices of the recorded industrial sound;
c. reducing noise in said plurality of short term duration slices of recorded industrial sound to generate a plurality of noise reduced slices of industrial sound;
d. for each short term slice of industrial sound, extracting values of the same plurality of short term features as was used to generate said short term slice of feature values, resulting in an industrial short term slice of feature values;
e. associating a plurality of industrial short term slices of feature values together to form an industrial mid term duration frame of sound related information;
f. extracting from said industrial mid term duration frame of sound related information, values of the plurality F of mid term features, and associating said plurality F of mid term features together to form an industrial mid term vector of values of sound related information;
g. based on the values of the plurality F of mid term features of the industrial mid term vector of values of sound related information, generating an industrial principal component information vector, the values of the principal components of the industrial principal component vector constituting a pattern of values; and
h. using the rules generated by the classifier that was used to classify the reference principal component information set, applying the rules to the pattern of values of the industrial principal component vector to identify the tool condition that matches the pattern of values of the industrial principal component vector.

14. The method of claim 13, further comprising the step of testing the identified tool condition and, if the tool condition is normal, continuing to use the CNC machine to shape the workpiece, else, stop using the CNC machine to shape the workpiece.

15. The method of claim 13, the step of reducing the noise in said plurality of short term duration slices of recorded industrial sound comprising:
a. before the step of, in an industrial setting using the CNC machine to shape a workpiece;
    i. operating the CNC machine tool in the industrial setting when the shaping tool is not shaping material;
    ii. recording human audible sound while the CNC machine tool in the industrial setting is operating and not shaping material;
    iii. based on the recording of sound while the machine tool in the industrial setting is not shaping material, generating a profile of noise that relates to sounds in the industrial setting other than shaping material; and
b. combining the noise profile with the plurality of relatively short term duration slices of the recorded industrial sound in a manner that reduces the effect of noise that relates to industrial sounds other than shaping material.

16. A method for identifying tool condition of a shaping tool in an industrial setting, using a reference information set of CNC machine tool shaping sound related information and rules for generating tool condition labels based thereon, the method comprising the steps of:
a. recording human audible sound while a CNC machine tool is shaping a workpiece, including during normal operation and during deteriorating operation;
b. generating a plurality of relatively short term duration slices of the recorded sound;
c. selecting, by a human, for each said short term duration slice of sound, a shaping tool condition label, which selection has been made by the human based on listening to the sound generated while the machine is shaping a workpiece and judging the condition of the shaping tool and selecting a tool condition label that corresponds with the judged condition, and associating the selected shaping tool condition label with the corresponding short term duration slice of sound, resulting in a labeled short term slice of sound;
d. reducing noise in said plurality of short term duration slices of recorded sound to generate a plurality of labeled noise reduced slices of sound;
e. for each labeled noise reduced short term slice of sound, extracting values of a plurality of short term features, at least one of which is a time domain feature and at least one of which is a frequency domain feature, resulting in a labeled short term slice of feature values;
f. associating a plurality of labeled short term slices of feature values together to form a labeled mid term duration frame of sound related information;
g. extracting from said labeled mid term duration frame of sound related information, values of a plurality of mid term features (F), including at least one time domain mid term feature and at least one frequency domain mid term feature, and associating said plurality F of mid term features together to form a labeled mid term vector of values of sound related information;
h. repeating the steps 1.a through 1.g a plurality of times, to generate a labeled feature information set of a plurality of tool condition labeled mid term vectors of values of sound related information;
i. based on the values of the plurality of mid term features of the feature information set, generating a plurality of principal components (PC), where the plurality PC is smaller than the plurality F, and then generating, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;
j. if the principal component information set is imbalanced with respect to each of the tool condition labels, then balancing the principal component information set with respect to each of the tool condition labels to generate a balanced reference principal component information set;
k. choosing a specific classifier and classifying the reference principal component information set with regard to the tool condition labels to generate rules that match each pattern of values of a vector of values of principal components to a single tool condition label;
l. in an industrial setting, using a CNC machine of the same type as the CNC machine that was used to generate the reference information set to shape a workpiece of the same type that was shaped to generate the reference information set, and recording human audible sound while the CNC machine tool is shaping the workpiece;
m. generating a plurality of relatively short term duration slices of the recorded industrial sound;
n. reducing noise in said plurality of short term duration slices of recorded industrial sound to generate a plurality of noise reduced slices of industrial sound;
o. for each labeled short term slice of industrial sound, extracting values of the same plurality of short term features, used to generate said short term slice of feature values, resulting in an industrial short term slice of feature values;
p. associating a plurality of industrial short term slices of feature values together to form an industrial mid term duration frame of sound related information;

q. extracting from said industrial mid term duration frame of sound related information, values of the plurality F of mid term features, and associating said plurality F of mid term features together to form an industrial mid term vector of values of sound related information;

r. based on the values of the plurality F of mid term features of the industrial mid term vector of values of sound related information, generating an industrial principal component information vector, the values of the principal components of the industrial principal component vector constituting a pattern of values; and s. using the rules generated by the classifier that was used to classify the reference principal component information set, applying the rules to the pattern of values of the industrial principal component vector to identify the tool condition that matches the pattern of values of the industrial principal component vector.

17. The method of claim 16, further comprising the step of testing the identified tool condition and, if the tool condition is normal, continuing to use the CNC machine to shape the workpiece, else, stop using the CNC machine to shape the workpiece.

18. An apparatus for generating a reference information set of CNC machine tool shaping sound related information and rules for generating tool condition labels based thereon, the method comprising:

a. a recorder, configured for recording human audible sound while a CNC machine tool is shaping a workpiece, including during normal operation and during deteriorating operation;

b. coupled to the recorder, a time-wise audio signal slicer, configured to generate a plurality of relatively short term duration slices of the recorded sound;

c. a tool condition labeller, configured to assign, to each said short term duration slice of sound, a shaping tool condition label, which shaping tool condition label has been selected by a human operator based on listening to the sound generated while the machine is shaping a workpiece and judging the condition of the shaping tool and selecting a tool condition label that corresponds with the judged condition, and assigning the selected shaping tool condition label to the corresponding short term duration slice of sound, resulting in a labeled short term slice of sound;

d. a noise reducer, configured to reduce noise in said plurality of short term duration slices of recorded sound to generate a plurality of noise reduced slices of sound;

e. coupled to the noise reducer, a feature extractor, comprising:

i. a short term analyzer, configured to, for each labeled short term slice of sound, extract values of a plurality of short term features, at least one of which is a time domain feature and at least one of which is a frequency domain feature, resulting in a labeled short term slice of feature values;

ii. coupled to the short term analyzer, a mid term generator, configured to:

A. associate a plurality of short term slices of feature values together to form a labeled mid term duration frame of sound related information;

B. extract from said labeled mid term duration frame of sound related information, values of a plurality of mid term features (F), including at least one time domain mid term feature and at least one frequency domain mid term feature, and associate said plurality F of mid term features together to form a labeled mid term vector of values of sound related information; and C. to repeatedly form mid term duration frames of sound related information and extracting from each formed mid term duration frame of sound information, mid term features and associate each said plurality F of mid term features together to form a plurality of labeled mid term vectors of values of sound related information to generate a labeled feature information set of a plurality of tool condition labeled mid term vectors of values of sound related information;

f. coupled to said feature extractor, a principal component generator, configured to, based on the values of the plurality of mid term features of the feature information set, generate a plurality of principal components (PC), where the plurality PC is smaller than the plurality F, and then generate, corresponding to the feature information set, a principal component information set, of a plurality of labeled mid term vectors of values of principal components, the values of principal components of each vector constituting a pattern of values, each vector also having a tool condition label associated therewith, the plurality of mid term vectors of values of principal components, the pattern thereof, and tool condition labels together constituting a principal component information set;

g. coupled to the principal component generator, an information set balancer, configured to, if the principal component information set is imbalanced with respect to each of the tool condition labels, then balancing the principal component information set with respect to each of the tool condition labels to generate a balanced reference principal component information set; and h. a classifier configured to classify the reference principal component information set with regard to the tool condition labels to generate rules that match each pattern of values of a vector of values of principal components to a single tool condition label.

19. The apparatus of claim 18, the classifier comprising a specific classifier, further comprising, coupled to the information set balancer and the classifier, a principal component selector, configured to:

a. identify at least two subsets of principal components;

b. evaluate each of the subsets of principal components with the classifier to determine which subset of principal components works best with the classifier; and c. designating the principal components of the subset that works best as selected principal components.

20. The apparatus of claim 18, the noise reducer comprising:

a. a noise profiler configured to create a profile of human audible sound that arises while the CNC machine tool is operating and not shaping material of;

b. coupled to the noise profiler, a combiner, configured to combine the noise profile with the plurality of relatively short term duration slices of the recorded sound in a manner that reduces the effect of noise that relates to sounds other than shaping material.

21. The apparatus of claim 18, the information set balancer comprising a balancer configured to apply a SMOTE method to the principal component information set to generate a balanced principal component information set.

22. The apparatus of claim 18, the principal component generator comprising a generator configured to apply a Robust principal component analysis.

23. The apparatus of claim 19, the principal component selector comprising a wrapper method principal component selector.

24. The apparatus of claim 18, the classifier being selected from the group consisting of: Naïve Bayes, Multi-Class Support Vector Machine (SVM); Multi-Class Alternative Decision Tree (LADTree); Multinomial Logistic Regression; k-Nearest Neighbors (kNN); Decision Tree; Bagging (REPTree) and Artificial Neural Networks.

* * * * *